(12) United States Patent
Maruo

(10) Patent No.: US 10,958,361 B2
(45) Date of Patent: Mar. 23, 2021

(54) ANTENNA APPARATUS AND MEASUREMENT METHOD

(71) Applicant: ANRITSU CORPORATION, Kanagawa (JP)

(72) Inventor: Tomohiko Maruo, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 16/742,409

(22) Filed: Jan. 14, 2020

(65) Prior Publication Data

US 2020/0244377 A1 Jul. 30, 2020

(30) Foreign Application Priority Data

Jan. 29, 2019 (JP) .............................. JP2019-013517

(51) Int. Cl.
*H04B 17/00* (2015.01)
*H04B 17/15* (2015.01)
*H04B 17/24* (2015.01)
*H04B 17/10* (2015.01)
*H04B 5/00* (2006.01)

(52) U.S. Cl.
CPC ........... *H04B 17/15* (2015.01); *H04B 5/0031* (2013.01); *H04B 17/102* (2015.01); *H04B 17/24* (2015.01)

(58) Field of Classification Search
CPC ...... H04B 17/29; H04B 17/0085; H04B 3/00; H04B 5/0031; H04B 17/15; H04B 17/101; H04B 17/24; H04B 1/0064; H04B 2203/5495; H04B 5/00

See application file for complete search history.

(56) References Cited

U.S. PATENT DOCUMENTS

| 8,412,112 B2 * | 4/2013 | Foegelle ............ H04B 17/3911 455/67.12 |
| 9,377,495 B2 | 6/2016 | Chien et al. |
| 9,985,733 B1 * | 5/2018 | Lee ....................... H04B 17/102 |
| 10,536,226 B1 * | 1/2020 | Huynh ................... G01R 29/10 |
| 2020/0119443 A1 * | 4/2020 | Leather ................ H04B 5/0043 |

OTHER PUBLICATIONS

3GPP TR 38.803 V14.2.0 (Sep. 2017), Technical Report, 3rd Generation Partnership Project; Technical Specification Group Radio Access Network; Study on New Radio Access Technology; Radio Frequency (RF) and Co-Existence Aspects (Release 14).

* cited by examiner

*Primary Examiner* — Nhan T Le
(74) *Attorney, Agent, or Firm* — Pearne & Gordon LLP

(57) ABSTRACT

An antenna apparatus is configured to include: a DUT scan mechanism that executes total spherical scanning on a DUT having an antenna in an internal space of an OTA chamber around a reference point; a plurality of antennas disposed at a distance within a near field measurement range from the reference point; and signal analysis devices that respectively perform a near field measurement process related to total radiated power (TRP) based on reception signals of the antennas which receive radio signals in a spurious frequency bandwidth radiated from the antenna transmitting and receiving radio signals in a specified frequency bandwidth, during execution of the total spherical scanning.

20 Claims, 12 Drawing Sheets

| | AntennaUnit | |
|---|---|---|
| | Frequency | |
| | Lower | Upper |
| 1 | 6 GHz | 20 GHz |
| 2 | 20 GHz | 40 GHz |
| 3 | 40 GHz | 60 GHz |
| 4 | 60 GHz | 90 GHz |
| ⋮ | ⋮ | ⋮ |

FIG. 5

| D(cm) | Frequency (GHz) | Near/far Boundary (cm) | Path Loss(dB) | Frequency (GHz) | Near/far Boundary (cm) | Path Loss(dB) |
|---|---|---|---|---|---|---|
| 5 | 28 | 48 | 55 | 100 | 168 | 76.9 |
| 10 | 28 | 188 | 66.9 | 100 | 668 | 88.9 |
| 15 | 28 | 420 | 73.8 | 100 | 1500 | 96 |
| 20 | 28 | 748 | 78.9 | 100 | 2668 | 101 |
| 25 | 28 | 1168 | 82.7 | 100 | 4168 | 104.8 |
| 30 | 28 | 1680 | 85.9 | 100 | 6000 | 108 |

FIG. 15

ANTENNA APPARATUS AND MEASUREMENT METHOD

TECHNICAL FIELD

The present invention relates to an antenna apparatus and a measurement method capable of measuring a near field of a spurious signal radiated from an antenna of a device under test (DUT) during a test under an over the air (OTA) environment.

BACKGROUND ART

In recent years, with the development of multimedia, wireless terminals (smartphones and the like) in which an antenna for wireless communication, such as cellular and wireless LAN, is mounted are actively produced. In the future, in particular, there is a demand for a wireless terminal which transmits and receives radio signals corresponding to IEEE 802.11ad, 5G cellular, and the like using broadband signals in a millimeter wave band.

In a wireless terminal manufacturing plant, a performance test is performed in which an output level or reception sensitivity of a transmission radio wave defined for each communication standard is measured for an antenna for wireless communication provided in a wireless terminal to determine whether or not a predetermined standard is satisfied.

The test method is changing with generation of the wireless terminal. For example, in a performance test in which a wireless terminal (hereinafter, a 5G wireless terminal) for 5G new radio system (NR system) is set as a device under test (a DUT), an OTA test using an anechoic box (an OTA chamber) referred to as a compact antenna test range (hereinafter, a CATR) not affected by the surrounding radio wave environment is executed.

In the OTA test, a DUT and a test antenna are accommodated in the CATR, a test signal is transmitted from a test antenna to a DUT and a signal under measurement transmitted from an antenna of the DUT (hereinafter, an antenna under test) which receives the test signal is received by the test antenna with wireless communication, and a radio signal in a frequency bandwidth (a target frequency bandwidth) used by the antenna under test is measured.

Specifically, in an OTA test for a 5G wireless terminal as a target, it is also required to perform spurious measurement in addition to measurement of a radio signal in a target frequency bandwidth. The spurious measurement is a process of measuring a non-target frequency signal radiated from an antenna of a DUT during a test, that is, a radio signal of a spurious frequency bandwidth (a spurious signal).

As one measurement method according to a performance test for a wireless terminal in the related art, there is known a technology in which a wireless module to be measured disposed in a room in which an electromagnetic wave can be shielded is set as a target and a measurement apparatus measures a three-dimensional radiation pattern of the wireless module to which a radio signal is transmitted from an antenna while respectively rotating a rotation seat and a module rotation arm constituting a rotation mechanism by 180 degrees and 360 degrees based on a first rotation shaft and a second rotation shaft (for example, see Patent Document 1).

Further, as a measurement method for a performance test of a 5G wireless terminal in the related art, there is known a technology of measuring total radiated power (TRP) based on an equivalent isotropically radiated power (EIRP) sample of a near field area (excluding a reactive near field) (for example, see Non-Patent Document 1).

RELATED ART DOCUMENT

Patent Document

[Patent Document 1] U.S. Pat. No. 9,377,495
[Non-Patent Document 1] 3GPP TR 38.803 V14.2.0 (2017-09) Technical Specification (3GPP (Third Generation Partnership Project), issued in September 2017, Chapter 10.2.2.5 OTA measurements in the radiative near field column (Pages 159 to 161))

DISCLOSURE OF THE INVENTION

Problem that the Invention is to Solve

When measuring a target frequency signal and a spurious signal by using a 5G wireless terminal as a DUT under an OTA environment, a CATR is configured to include a DUT which includes an antenna under test, a test antenna, and a spurious measurement antenna (hereinafter, a measurement antenna). In a case of dividing the spurious signal with a plurality of frequency bandwidths and measuring the spurious signal, a plurality of measurement antennas are required.

In the measurement apparatus using the CATR in the related art, it is common to perform measurement in a far field for any of a radio signal in a target frequency bandwidth used by the antenna under test or a radio signal (a spurious signal) in a non-target frequency bandwidth.

Regarding the far field measurement, there are known a first characteristic that it is necessary to dispose the measurement antenna in the far field area from the DUT and a second characteristic that attenuation (hereinafter, a power loss) of radiated power to the measurement antenna increases as a distance between the DUT and the measurement antenna increases, that is, the radiated power depends on the distance between the DUT and the measurement antenna.

Regarding the first characteristic, from the viewpoint of compactification of the CATR, there is also a movement to adopt an indirect far field (IFF) method of disposing a reflector having a paraboloid of revolution in a signal propagation path between a DUT antenna and the test antenna, instead of a direct far field (DFF) method.

Further, regarding the second characteristic, for example, in the example illustrated in FIG. 15, focusing on a value of a part surrounded by a thick frame, between a case where a DUT having a maximum straight line size of 15 cm and a use frequency of 28 GHz (a millimeter wave band) is disposed at a distance of 420 cm away from an antenna and a case where a DUT having the same size and a use frequency of 100 GHz is disposed at a distance of 1500 cm from the antenna, it can be seen that a power loss (a path Loss) in the latter case is larger.

On the other hand, for near field measurement, Non-Patent Document 1 describes that "an effect of a measurement antenna on the fact that a wave is not plane is handled by compensation of a probe. In a case of TRP, total radiated power of an entire sphere does not depend on a distance between a test object and a measurement antenna.", and in TRP measurement in the near field, total radiated power independent of the distance between the DUT and the measurement antenna can be obtained.

Meanwhile, in the measurement apparatus of the IFF method in the related art, in the CATR, the measurement antenna is disposed in a far field area via the reflector from the DUT and far field measurement is performed on a spurious signal based on a reception signal of the measurement antenna, but no measurement antenna is disposed at a distance in the near field area from the DUT.

For this reason, in the measurement apparatus in the related art, there is only a far field measurement method for measuring a spurious signal radiated from the antenna under test, and there is a limit in maintaining of downsizing of the CATR, and is possible to obtain only a result of measuring a power loss occurring depending on a distance between the DUT and the measurement antenna. Further, in the related art, in order to measure a spurious signal by dividing the spurious signal into a plurality of frequency bandwidths, it is necessary to prepare a plurality of measurement antennas to be used for each frequency bandwidth and to replace the measurement antennas for use, and there is a problem that the spurious measurement is complicated.

The present invention is made to solve such problems in the related art, and it is an object of the present invention to provide an antenna apparatus and a measurement method capable of realizing efficient spurious measurement while avoiding an increase in the size of an anechoic box and an increase of a power loss depending on a distance between a device under test (DUT) and a measurement antenna.

Means for Solving the Problem

According to a first aspect of the present invention, there is provided an antenna apparatus including: an anechoic box that includes an internal space not affected by a surrounding radio wave environment; scanning means that sets a center of a spherical coordinate system as a reference point and rotatably drives a device under test (DUT) having an antenna under test around the reference point as a center to execute total spherical scanning, in the internal space; a measurement antenna that receives a radio signal in a spurious frequency bandwidth radiated from the antenna under test transmitting and receiving radio signals in a specified frequency bandwidth during execution of the total spherical scanning, and is disposed at a distance within a near field measurement range from the reference point; and near field measurement processing means that performs a near field measurement process related to power of the radio signal in the spurious frequency bandwidth, based on a reception signal of the measurement antenna.

With this configuration, in the antenna apparatus according to the first aspect of the present invention, by disposing the measurement antenna at a distance in the near field measurement range from the reference point at which the device under test (DUT) is disposed, it is possible to avoid a size of the anechoic box being increased. In addition, according to the near field measurement process based on the reception signal of the measurement antenna disposed at the distance in the near field measurement range, it is possible to realize spurious measurement with less power loss and shorter measurement time without depending on a distance between the measurement antenna and the device under test (DUT).

In addition, in an antenna apparatus according to a second aspect of the present invention, the near field measurement processing means measures equivalent isotropically radiated power (EIRP) in all orientations and measures total radiated power (TRP) which is a sum of the EIRPs in all the orientations based on a reception signal of the measurement antenna.

With this configuration, in the antenna apparatus according to the second aspect of the present invention, it is possible to respectively measure the EIRPs in the spherical coordinate system in all the orientations and obtain the TRP by calculating a sum of the respective EIRPs, and it is possible to simplify the spurious measurement process by the near field measurement processing means.

In addition, an antenna apparatus according to a third aspect of the present invention, in which a plurality of the measurement antennas are provided, each of the measurement antennas uses each of radio signals in a plurality of division frequency bandwidths divided in advance of the spurious frequency bandwidth ranging from a frequency bandwidth lower than the specified frequency bandwidth to a frequency bandwidth higher than the specified frequency bandwidth, and the near field measurement processing means performs the near field measurement process for each of the plurality of division frequency bandwidths divided in advance of the spurious frequency bandwidth based on a reception signal of each of the measurement antennas, during execution of the total spherical scanning.

With this configuration, in the antenna apparatus according to the third aspect of the present invention, even in a case where the plurality of measurement antennas are used, while maintaining compactness of the anechoic box, it is possible to realize efficient spurious measurement in a wide frequency bandwidth for the DUT by performing one total spherical scanning on the device under test (DUT) without a need to switch each measurement antenna.

In addition, an antenna apparatus according to a fourth aspect of the present invention, further includes: a test antenna that uses a radio signal in the specified frequency bandwidth; and a simulation measurement apparatus that outputs a test signal to the device under test (DUT) via the test antenna, receives a signal under measurement output from the device under test (DUT) to which the test signal is input by the test antenna, and performs measurement on a radio signal in the specified frequency bandwidth based on the received signal under measurement, during the total spherical scanning.

With this configuration, in the antenna apparatus according to the fourth aspect of the present invention, in accordance with the performance test of the antenna under test, it is possible to efficiently perform spurious measurement for each division frequency bandwidth.

In addition, in an antenna apparatus according to a fifth aspect of the present invention, when a maximum straight line size of the device under test (DUT) is D and a wavelength of a radio signal used by the antenna under test is λ, the measurement antenna is disposed at a position having a distance R in an area of a radiative near field from the reference point as represented by the following equation.

$$0.62\sqrt{\frac{D^3}{\lambda}} < R < \frac{2D^2}{\lambda}$$

With this configuration, in the antenna apparatus according to the fifth aspect of the present invention, it is possible to reduce accuracy degradation related to spurious measurement when the measurement antenna is disposed too close to the reference point in the measurement system, and it is possible to realize accurate spurious measurement based on the reception signal of the measurement antenna.

In addition, in an antenna apparatus according to a sixth aspect of the present invention, the scanning means includes a turntable that is rotatable around an azimuth shaft, a support member vertically installed on the turntable, a device under test (DUT) placement unit that is disposed in parallel to the turntable with respect to the support member and is rotatable around a roll shaft, and driving means that includes first rotation driving means which rotatably drives the azimuth shaft and second rotation driving means which rotatably drives the roll shaft.

With this configuration, in the antenna apparatus according to the sixth aspect of the present invention, while maintaining a simple configuration of the scanning means, it is possible to easily perform the total spherical scanning on the device under test (DUT) by controlling the first and second rotation driving means as appropriate.

In addition, an antenna apparatus according to a seventh aspect of the present invention, further includes: a reflector that is accommodated in the internal space, has a predetermined paraboloid of revolution, and reflects a radio signal transmitted or received by the antenna under test and the test antenna via the paraboloid of revolution.

With this configuration, in the antenna apparatus according to the seventh aspect of the present invention, it is possible to reduce the distance between the test antenna and the antenna under test for the performance test of the device under test (DUT), and it is possible to avoid an increase in the size of the anechoic box in combination with disposition of the measurement antenna at the distance in the near field measurement area from the reference point.

In addition, an antenna apparatus according to a eighth aspect of the present invention, in which a plurality of the measurement antennas are provided, each of the measurement antennas uses each of radio signals in a plurality of division frequency bandwidths divided in advance of the spurious frequency bandwidth ranging from a frequency bandwidth lower than the specified frequency bandwidth to a frequency bandwidth higher than the specified frequency bandwidth, and the near field measurement processing means performs the near field measurement process for each of the plurality of division frequency bandwidths divided in advance of the spurious frequency bandwidth based on a reception signal of each of the measurement antennas, during execution of the total spherical scanning.

In addition, an antenna apparatus according to a ninth aspect of the present invention, further includes: a test antenna that uses a radio signal in the specified frequency bandwidth; and a simulation measurement apparatus that outputs a test signal to the device under test (DUT) via the test antenna, receives a signal under measurement output from the device under test (DUT) to which the test signal is input by the test antenna, and performs measurement on a radio signal in the specified frequency bandwidth based on the received signal under measurement, during the total spherical scanning.

In addition, an antenna apparatus according to a tenth aspect of the present invention, further includes: a test antenna that uses a radio signal in the specified frequency bandwidth; and a simulation measurement apparatus that outputs a test signal to the device under test (DUT) via the test antenna, receives a signal under measurement output from the device under test (DUT) to which the test signal is input by the test antenna, and performs measurement on a radio signal in the specified frequency bandwidth based on the received signal under measurement, during the total spherical scanning.

In addition, in an antenna apparatus according to an eleventh aspect of the present invention, when a maximum straight line size of the device under test (DUT) is D and a wavelength of a radio signal used by the antenna under test is λ, the measurement antenna is disposed at a position having a distance R in an area of a radiative near field from the reference point as represented by the following equation.

$$0.62\sqrt{\frac{D^3}{\lambda}} < R < \frac{2D^2}{\lambda}$$

In addition, in an antenna apparatus according to a twelfth aspect of the present invention, when a maximum straight line size of the device under test (DUT) is D and a wavelength of a radio signal used by the antenna under test is λ, the measurement antenna is disposed at a position having a distance R in an area of a radiative near field from the reference point as represented by the following equation.

$$0.62\sqrt{\frac{D^3}{\lambda}} < R < \frac{2D^2}{\lambda}$$

In addition, in an antenna apparatus according to a thirteenth aspect of the present invention, when a maximum straight line size of the device under test (DUT) is D and a wavelength of a radio signal used by the antenna under test is λ, the measurement antenna is disposed at a position having a distance R in an area of a radiative near field from the reference point as represented by the following equation.

$$0.62\sqrt{\frac{D^3}{\lambda}} < R < \frac{2D^2}{\lambda}$$

In addition, in an antenna apparatus according to a fourteenth aspect of the present invention, the scanning means includes a turntable that is rotatable around an azimuth shaft, a support member vertically installed on the turntable, a device under test (DUT) placement unit that is disposed in parallel to the turntable with respect to the support member and is rotatable around a roll shaft, and driving means that includes first rotation driving means which rotatably drives the azimuth shaft and second rotation driving means which rotatably drives the roll shaft.

In addition, in an antenna apparatus according to a fifteenth aspect of the present invention, the scanning means includes a turntable that is rotatable around an azimuth shaft, a support member vertically installed on the turntable, a device under test (DUT) placement unit that is disposed in parallel to the turntable with respect to the support member and is rotatable around a roll shaft, and driving means that includes first rotation driving means which rotatably drives the azimuth shaft and second rotation driving means which rotatably drives the roll shaft.

In addition, in an antenna apparatus according to a sixteenth aspect of the present invention, the scanning means includes a turntable that is rotatable around an azimuth shaft, a support member vertically installed on the turntable, a device under test (DUT) placement unit that is disposed in parallel to the turntable with respect to the support member and is rotatable around a roll shaft, and driving means that includes first rotation driving means which rotatably drives the azimuth shaft and second rotation driving means which rotatably drives the roll shaft.

In addition, in an antenna apparatus according to a seventeenth aspect of the present invention, the scanning means includes a turntable that is rotatable around an azimuth shaft, a support member vertically installed on the turntable, a device under test (DUT) placement unit that is disposed in parallel to the turntable with respect to the support member and is rotatable around a roll shaft, and driving means that includes first rotation driving means which rotatably drives the azimuth shaft and second rotation driving means which rotatably drives the roll shaft.

In addition, an antenna apparatus according to an eighteenth aspect of the present invention, further includes: a reflector that is accommodated in the internal space, has a predetermined paraboloid of revolution, and reflects a radio signal transmitted or received by the antenna under test and the test antenna via the paraboloid of revolution.

In addition, an antenna apparatus according to a nineteenth aspect of the present invention, further includes: a reflector that is accommodated in the internal space, has a predetermined paraboloid of revolution, and reflects a radio signal transmitted or received by the antenna under test and the test antenna via the paraboloid of revolution.

According to a twentieth aspect of the present invention, there is provided a measurement method of performing measurement on a device under test (DUT) by using an antenna apparatus including an anechoic box that includes an internal space not affected by a surrounding radio wave environment, scanning means that executes total spherical scanning by setting a center of a spherical coordinate system as a reference point and rotatably driving a device under test (DUT) having an antenna under test around the reference point as a center to sequentially face all orientations set in advance in the spherical coordinate system, in the internal space, a measurement antenna that receives a radio signal in a spurious frequency bandwidth radiated from the antenna under test transmitting and receiving radio signals in a specified frequency bandwidth during execution of the total spherical scanning, and near field measurement processing means that performs a near field measurement process related to power of the radio signal in the spurious frequency bandwidth, based on a reception signal of the measurement antenna disposed at a distance within a near field measurement range from the reference point, the method including: a placement step of placing the device under test (DUT) on a device under test (DUT) placement unit of the scanning means in the anechoic box; a test signal output step of outputting a test signal to the device under test (DUT) via the test antenna by a simulation measurement apparatus; a total spherical scanning step of executing the total spherical scanning on the device under test (DUT) placed on the device under test (DUT) placement unit by the scanning means; a signal reception step of receiving a radio signal in the spurious frequency bandwidth output together with a signal under measurement from the device under test (DUT) to which the test signal is input, during execution of the total spherical scanning, by the measurement antenna; and a near field measurement processing step of performing a near field measurement process related to power of the radio signal in the spurious frequency bandwidth, based on a reception signal of each of the measurement antennas in the signal reception step.

With this configuration, in the measurement method according to the twentieth aspect of the present invention, by disposing the measurement antenna at the distance in the near field measurement range from the reference point at which the device under test (DUT) is disposed and performing the near field measurement process, while avoiding the size of the anechoic box being increased, it is possible to perform spurious measurement with less power loss and shorter measurement time without depending on the distance between the measurement antenna and the device under test (DUT).

Advantage of the Invention

The present invention provides an antenna apparatus and a measurement method capable of realizing efficient spurious measurement while avoiding an increase in the size of an anechoic box and an increase of a power loss depending on a distance between a device under test (DUT) and a measurement antenna.

BRIEF DESCRIPTION OF THE DRAWINGS

FIG. 5 is a table illustrating use frequency classification of a plurality of measurement antennas adopted in an OTA chamber of the measurement apparatus according to the embodiment of the present invention.

FIG. 13A is a diagram illustrating a spherical coordinate system related to total spherical scanning of the DUT, and FIG. 13B is a diagram illustrating distribution of angle sample points in the spherical coordinate system.

FIG. 15 is a table illustrating a relationship between a DUT size, a use frequency, and a measurement area section and a power loss.

BEST MODE FOR CARRYING OUT THE INVENTION

Hereinafter, embodiments a measurement apparatus and measurement method according to the present invention will be described with reference to the drawings.

Figure 1:
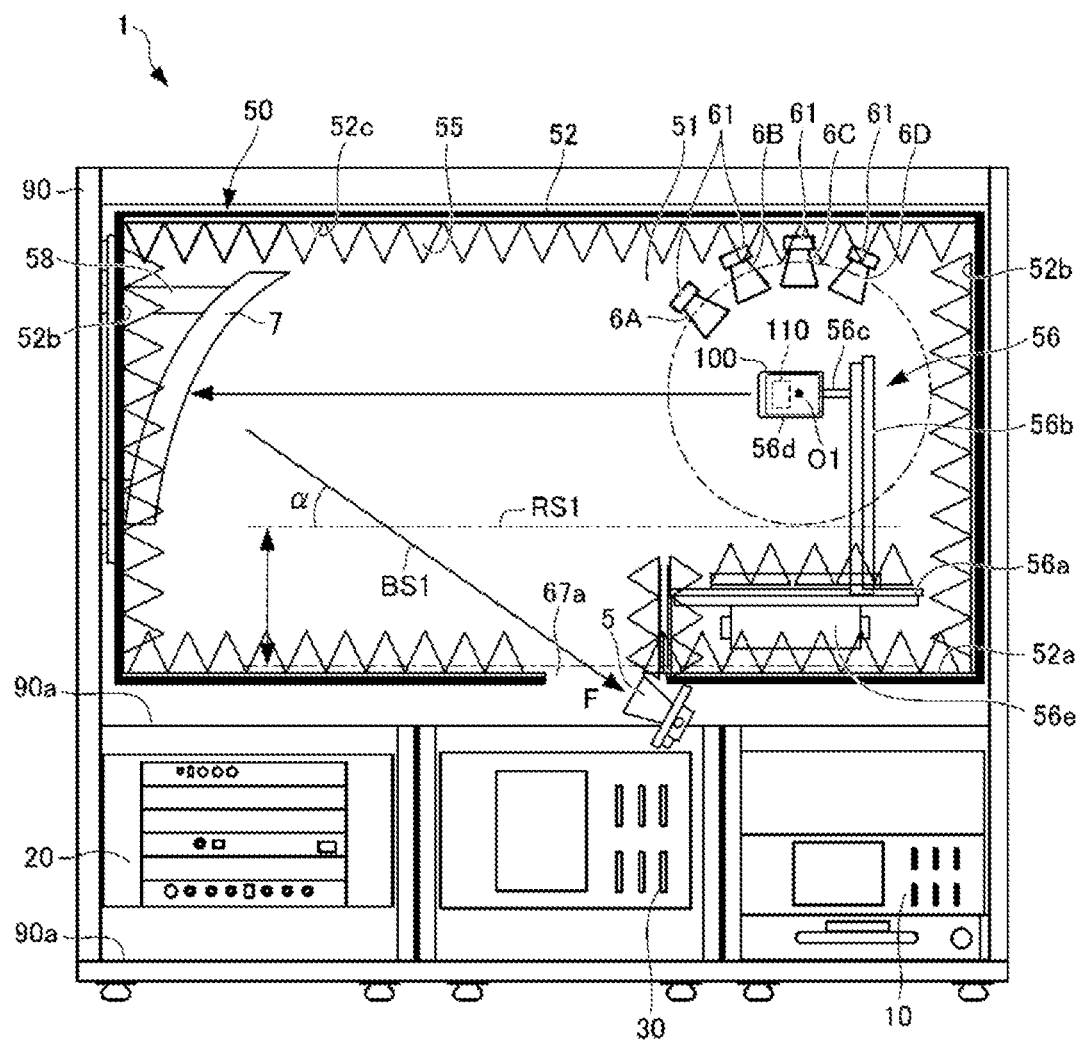
FIG. 1 is a diagram illustrating a schematic configuration of an entire measurement apparatus according to an embodiment of the present invention.
Figure 2:
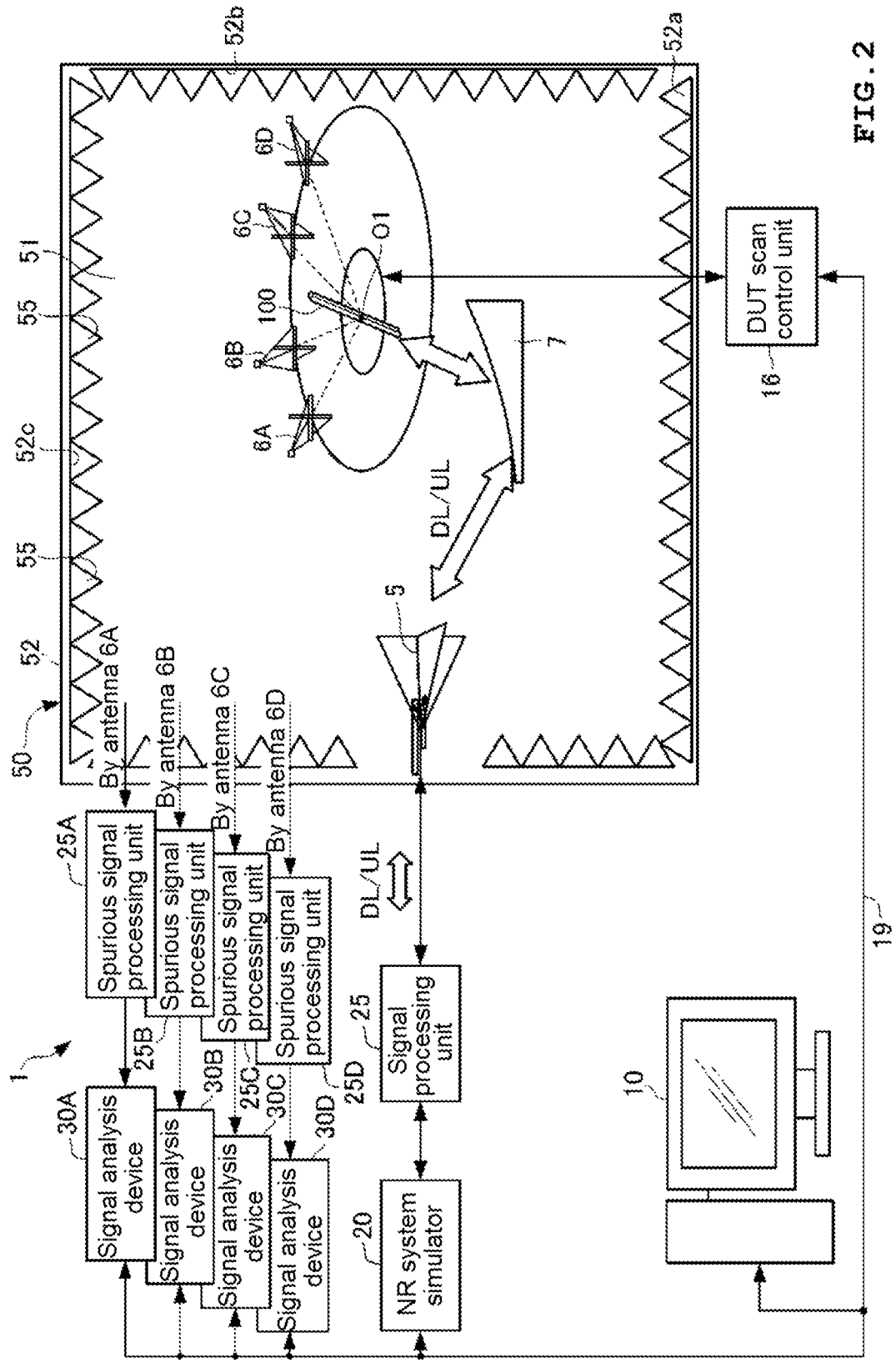
FIG. 2 is a block diagram illustrating a functional configuration of the measurement apparatus according to the embodiment of the present invention.

First, a configuration of a measurement apparatus 1 according to an embodiment of the present invention will be described with reference to FIGS. 1 to 13. The measurement apparatus 1 corresponds to an antenna apparatus according to the present invention. The measurement apparatus 1 according to the present embodiment has an appearance structure as illustrated in FIG. 1 as a whole, and is configured to include functional blocks as illustrated in FIG. 2. FIGS. 1 and 2 illustrate a disposition mode of each configuration component of an OTA chamber 50 when seen from the side of the OTA chamber 50.

As illustrated in FIGS. 1 and 2, the measurement apparatus 1 according to the present embodiment includes an integrated control device 10, an NR system simulator 20, a signal processing unit 25, signal analysis devices 30A, 30B, 30C, and 30D, a spurious signal processing units 40A, 40B, 40C, and 40D, and the OTA chamber 50.

The integrated control device 10 is communicably connected to the NR system simulator 20 and the signal analysis devices 30A, 30B, 30C, and 30D with each other via a network 19 such as Ethernet (registered trademark). In addition, the integrated control device 10 is also connected to a system element to be controlled in the OTA chamber 50, for example, a DUT scan control unit 16 via the network 19.

Figure 3:
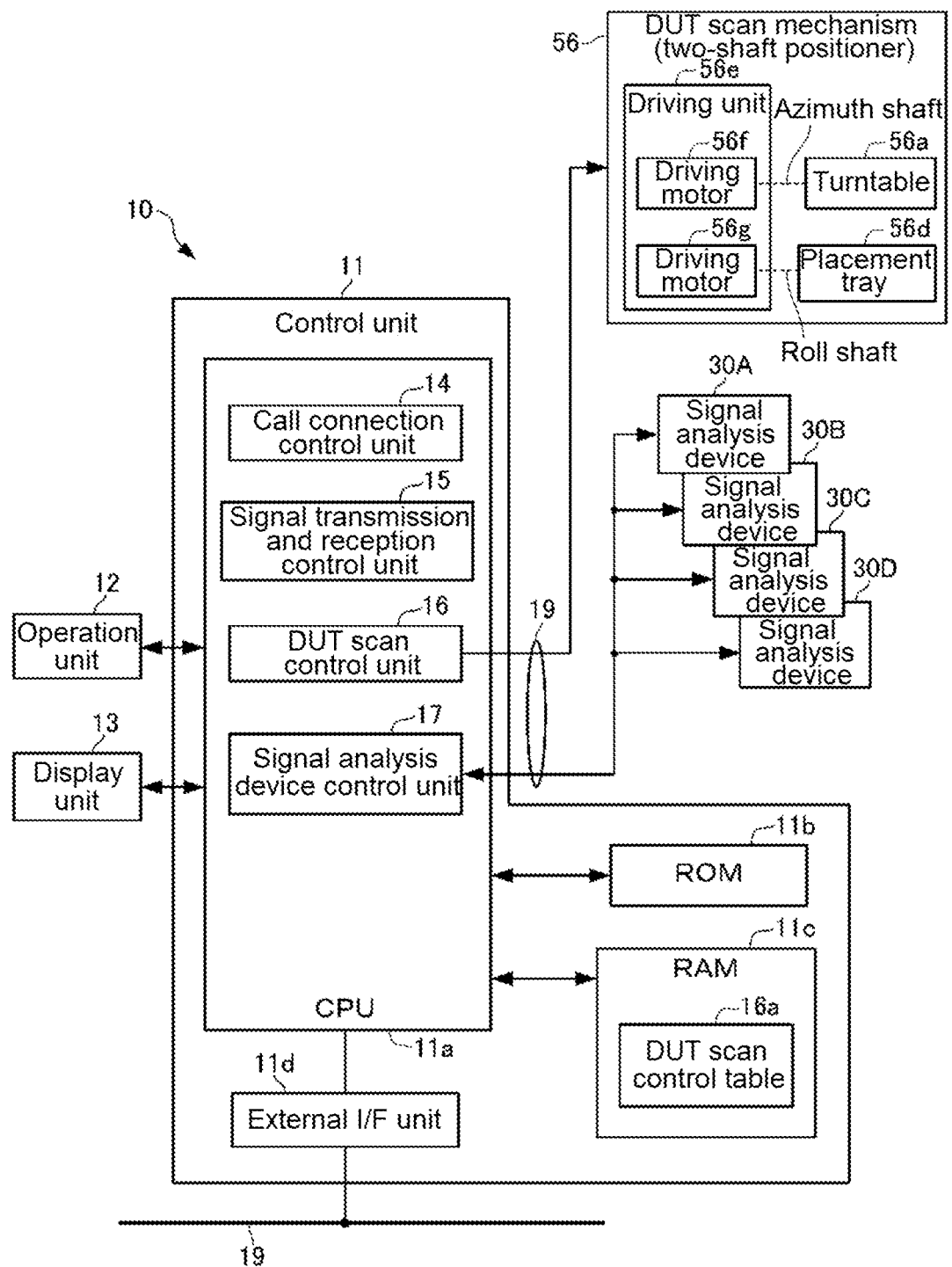
FIG. 3 is a block diagram illustrating a functional configuration of an integrated control device of the measurement apparatus according to the embodiment of the present invention.

The integrated control device 10 generally controls the NR system simulator 20, a plurality of signal analysis devices 30A, 30B, 30C, and 30D, and the DUT scan control unit 16 via the network 19, and is configured as, for example, a personal computer (PC). The DUT scan control unit 16 may be provided independently of the OTA chamber 50 (see FIG. 2), or may be provided in the integrated control device 10 as illustrated in FIG. 3. Hereinafter, it is assumed that the integrated control device 10 has the configuration illustrated in FIG. 3.

The measurement apparatus 1 operates in a mode in which the components described above are mounted on each rack 90a of a rack structure 90 having the structure illustrated in FIG. 1, for example. FIG. 1 illustrates an example in which the integrated control device 10, the NR system simulator 20, the signal analysis devices 30A, 30B, 30C, and 30D, and the OTA chamber 50 are respectively mounted on each rack 90a of the rack structure 90.

Configurations of the integrated control device 10, the NR system simulator 20, and the signal analysis devices 30A, 30B, 30C, and 30D will be described in detail later, and first, a configuration of the OTA chamber 50 will be described. The OTA chamber 50 realizes an OTA test environment and a spurious measurement environment when testing a 5G wireless terminal, and is used as an example of the CATR described above.

As illustrated in FIGS. 1 and 2, for example, the OTA chamber 50 is configured to include a metal housing main body 52 having a rectangular internal space 51, and a DUT 100 having an antenna 110, a test antenna 5, a plurality of spurious measurement antennas 6A, 6B, 6C, and 6D (hereinafter, also referred to as antennas 6), a reflector 7, and a DUT scan mechanism 56 are accommodated in the internal space 51.

A radio wave absorber 55 is attached to total inner surfaces of the OTA chamber 50, that is, a bottom surface 52a, a side surface 52b, and a top surface 52c of the housing main body 52. Accordingly, the OTA chamber 50 is provided to strengthen a function of suppressing intrusion of radio waves from the outside and emission of radio waves to the outside for each element (the DUT 100, the test antenna 5, the plurality of antennas 6A, 6B, 6C, and 6D, the reflector 7, and the DUT scan mechanism 56) disposed in the internal space 51. In this manner, the OTA chamber 50 realizes an anechoic box having the internal space 51 not affected by the surrounding radio wave environment. The anechoic box used in the present embodiment has, for example, an anechoic type.

Among those accommodated in the internal space 51 of the OTA chamber 50, the DUT 100 is a wireless terminal such as a smartphone or the like. An example of a communication standard for the DUT 100 includes cellular (LTE, LTE-A, and W-CDMA (registered trademark), GSM (registered trademark), CDMA2000, 1×EV-DO, TD-SCDMA, or the like), wireless LAN (IEEE802.11b/g/a/n/ac/ad or the like), Bluetooth (registered trademark), GNSS (GPS, Galileo, GLONASS, BeiDou, or the like), FM, and digital broadcasting (DVB-H, ISDB-T, or the like). Further, the DUT 100 may be a wireless terminal which transmits and receives radio signals in a millimeter wave bandwidth corresponding to IEEE802.11ad, 5G cellular, or the like.

In the present embodiment, the antenna 110 of the DUT 100 uses, for example, a radio signal in a specified frequency bandwidth based on a 5G NR standard. Specifically, the antenna 110 may use, for example, a frequency bandwidth ranging from 24.25 GHz to 43.5 GHz, for example, in a frequency bandwidth extending over the numbers 2 and 3 in the table illustrated in FIG. 5, as a specified frequency bandwidth. The DUT 100 and the antenna 110 respectively correspond to a device under test (DUT) and an antenna under test in the present invention.

In the internal space 51 of the OTA chamber 50, the DUT 100 is held by a part of the DUT scan mechanism 56. The DUT scan mechanism 56 is provided on the bottom surface 52a of the housing main body 52 in the internal space 51 of the OTA chamber 50 so as to extend in a vertical direction. The DUT scan mechanism 56 performs total spherical scanning to be described below on the DUT 100 while holding the DUT 100 under a performance test.

As illustrated in FIG. 1, the DUT scan mechanism 56 includes a turntable 56a, a support member 56b, a DUT placement unit 56c, and a driving unit 56e. The turntable 56a is configured by a plate member having a disc shape, and is configured to be rotated around an azimuth shaft (a rotation shaft in a vertical direction) (see FIG. 3). The support member 56b is configured by a columnar member disposed to extend in a vertical direction on a plate surface of the turntable 56a.

The DUT placement unit 56c is disposed in a vicinity of an upper end of the support member 56b in parallel with the turntable 56a, and has a placement tray 56d on which the DUT 100 is placed. The DUT placement unit 56c is configured to be rotatable around a roll shaft (a rotation shaft in a horizontal direction) (see FIG. 3).

For example, as illustrated in FIG. 3, the driving unit 56e includes a driving motor 56f which rotationally drives the azimuth shaft and a driving motor 56g which rotationally drives the roll shaft. The driving unit 56e is configured by a two-shaft positioner including a mechanism for rotating the azimuth shaft and the roll shaft in respective rotation directions by the driving motor 56f and the driving motor 56g. In this manner, the driving unit 56e can rotate the DUT 100 placed on the placement tray 56d in the two-shaft (the azimuth shaft and the roll shaft) directions together with the placement tray 56d. Hereinafter, the entire DUT scan mechanism 56 including the driving unit 56e may be referred to as a two-shaft positioner (see FIG. 3). The driving unit 56e and the driving motors 56f and 56g respectively constitute driving means, first rotation driving means, and second rotation driving means in the present invention. The placement tray 56d constitutes a device under test (DUT) placement unit in the present invention.

In the DUT scan mechanism 56, it is assumed that the DUT 100 placed (held) on the placement tray 56d is disposed at, for example, a center O1 of the sphere (see sphere B in FIG. 12), and total spherical scanning is performed while a posture of the DUT 100 is sequentially changed so that the antenna 110 faces a sphere surface in all orientations. The DUT scan control unit 16 to be described below controls the DUT scanning in the DUT scan mechanism 56. The DUT scan mechanism 56 and the DUT scan control unit 16 constitute scanning means in the present invention.

The test antenna 5 is attached to a required position on the bottom surface 52a of the housing main body 52 of the OTA chamber 50 by using an appropriate holder (not illustrated). The attachment position of the test antenna 5 is a position at which a visual field from the reflector 7 can be secured via an opening 67a provided in the bottom surface 52a. The test antenna 5 uses a radio signal in the same specified frequency bandwidth (24.25 GHz to 43.5 GHz) as the antenna 110 of the DUT 100.

When performing a performance test of the DUT 100 in the OTA chamber 50, the test antenna 5 transmits a test signal to the DUT 100 and receives a signal under test transmitted from the DUT 100 which receives the test signal. The test antenna 5 uses a radio signal in the same specified frequency bandwidth as the antenna 110 of the DUT 100. The test antenna 5 is disposed so that a light receiving surface of the test antenna 5 is a focal position F of the reflector 7.

The plurality of antennas 6A, 6B, 6C, and 6D receive a spurious signal radiated from the antenna 110 of the DUT 100 during the performance test for the DUT 100. The plurality of antennas 6A, 6B, 6C, and 6D are fixedly attached in the internal space 51 of the OTA chamber 50 by using a predetermined antenna attachment 61. The antennas 6A, 6B, 6C, and 6D respectively use radio signals in a plurality of division frequency bandwidths set (divided) in advance of a predetermined spurious frequency bandwidth from a frequency bandwidth lower than the specified frequency bandwidth used by the test antenna 5 and the antenna 110 of the DUT 100 to a frequency bandwidth higher than the specified frequency bandwidth. The antennas 6A, 6B, 6C, and 6D constitute a plurality of measurement antennas in the present invention.

FIG. 5 is a table illustrating use frequency classification of the plurality of antennas 6A, 6B, 6C, and 6D disposed in the OTA chamber 50 according to the present embodiment. In FIG. 5, for example, a total frequency bandwidth of 6 GHz to 90 GHz used by the plurality of antennas 6A, 6B, 6C, and 6D is divided into a plurality of bandwidths (division frequency bandwidths) of 6 GHz to 20 GHz, 20 GHz to 40 GHz, 40 GHz to 60 GHz, 60 GHz to 90 GHz, . . . , corresponding to the numbers 1, 2, 3, 4, . . . . In the OTA chamber 50 according to the present embodiment, the four antennas 6A, 6B, 6C, and 6D disposed in the internal space 51 use division frequency bandwidths respectively corresponding to the numbers 1, 2, 3, and 4, in the use frequency classification in FIG. 5, for example.

The reflector 7 is attached to a required position on the side surface 52b of the OTA chamber 50 by using a reflector holder 58. The reflector 7 realizes a radio wave path for turning back a radio signal (a test signal and a signal under measurement) transmitted and received by the antenna 110 of the DUT 100 to the light receiving surface of the test antenna 5.

The reflector 7 is attached at a position and posture at which the test signal transmitted from the test antenna 5 and the signal under measurement transmitted from the antenna 110 of the DUT 100 can be incident on a paraboloid of revolution. Accordingly, the reflector 7 can receive a test signal transmitted from the test antenna 5 on the paraboloid of revolution and reflect the test signal toward the DUT 100, while the reflector 7 can receive a signal under measurement transmitted from the DUT 100 which receives the test signal on the paraboloid of revolution and reflect the signal under measurement toward the test antenna 5 disposed at the focal position F of the paraboloid of revolution. In the present embodiment, the reflector 7 has, for example, an offset parabolic type structure (see FIG. 8).

Figure 6A:
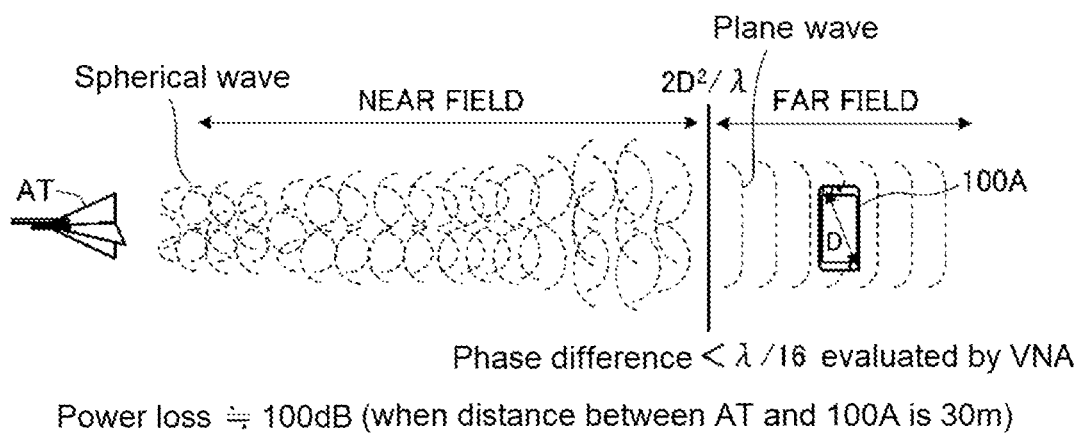
FIGS. 6A and 6B is a schematic diagram for explaining a near field and a far field in radio wave propagation between an antenna and a wireless terminal.
Figure 6B:
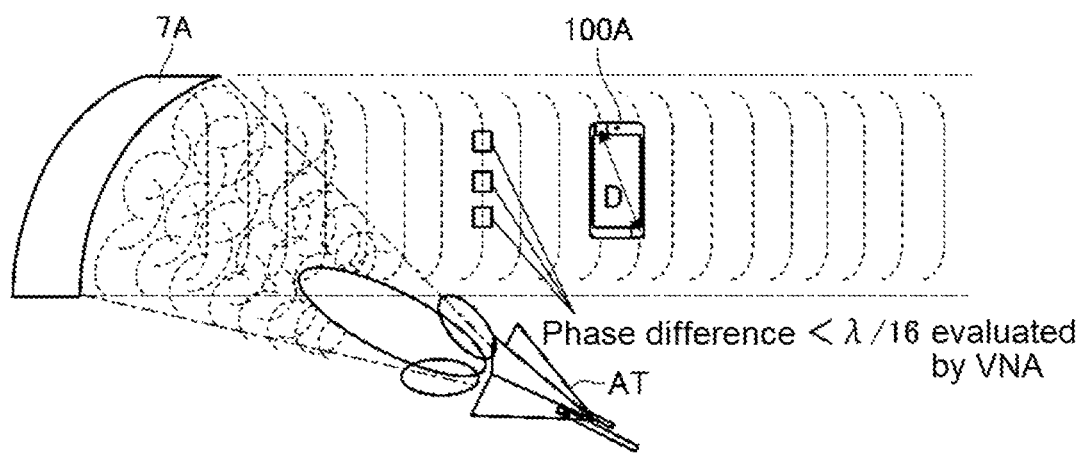
Figure 7:
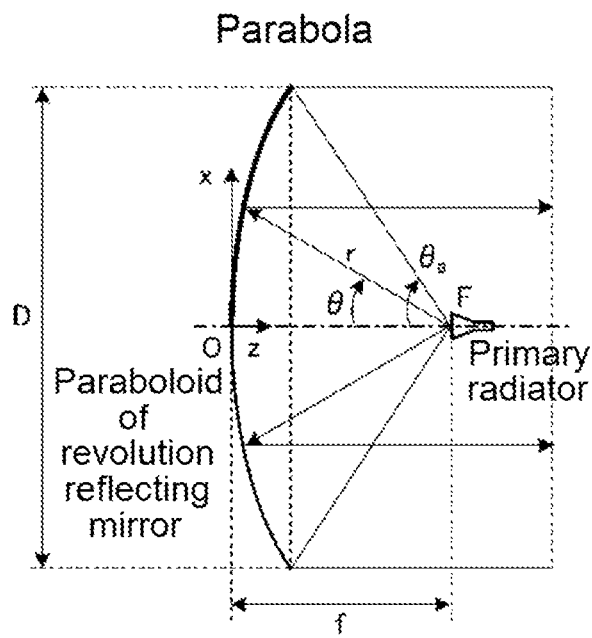
FIG. 7 is a schematic diagram illustrating a signal path structure of a parabola having a paraboloid of revolution in the same manner as that of a reflector adopted in the OTA chamber of the measurement apparatus according to the embodiment of the present invention.

Here, the merit of mounting the reflector 7 in the OTA chamber 50 and the appropriate form of the reflector 7 will be described with reference to FIGS. 6 to 8. FIGS. 6A and 6B are schematic diagrams illustrating transmission of a radio wave radiated from the antenna AT equivalent to the test antenna 5 to a wireless terminal 100A. The wireless terminal 100A is equivalent to the DUT 100. In FIGS. 6A and 6B, FIG. 6A illustrates an example in which the radio wave is directly transmitted from the antenna AT to the wireless terminal 100A (direct far field (DFF)), and FIG. 6B illustrates an example in which the radio wave is transmitted from the antenna AT to the wireless terminal 100A via a reflecting mirror 7A having a paraboloid of revolution (indirect far field (IFF)).

As illustrated in FIG. 6A, a radio wave with the antenna AT as a radiation source has a property of being propagated while a wavefront spreads spherically around the radiation source. In addition, it is known that at a distance close to the radiation source, a surface (a wavefront) obtained by connecting points having the same phase of a wave is a curved spherical surface (a spherical wave), while the wavefront is close to a plane (a plane wave) as the distance is far from the radiation source. In general, an area in which the wavefront is considered as a spherical surface is called a near field, and an area in which the wavefront is regarded as a plane is called a far field. In the propagation of radio waves illustrated in FIG. 6A, the wireless terminal 100A may transmit and receives plane waves rather than transmitting and receiving spherical waves so as to obtain an appropriate performance test result.

In order to transmit and receive a plane wave, it is necessary to install the wireless terminal 100A in a far field viewed from the antenna AT. Here, when a maximum straight line size of the wireless terminal 100A is D and a wavelength is λ, a far field is a distance far from the antenna AT by 2D2/λ or more. Accordingly, for example, in a case where D=0.4 meter (m) and wavelength λ=0.01 m (corresponding to a radio signal in 28 GHz bandwidth), a position of approximately 30 m from the antenna AT is a boundary between a near field and a far field, and it is necessary to place the wireless terminal 100A at a position farther than the position. In the present embodiment, it is assumed that the DUT 100 having a maximum straight line size D of, for example, approximately 5 centimeter (cm) to 33 cm is measured.

In a disposition of the DFF method illustrated in FIG. 6A, as a propagation distance between the antenna AT and the wireless terminal 100A is large, a power loss is also large. As a countermeasure for reducing the power loss, for example, as illustrated in FIG. 6B, there is the IFF method in which the reflecting mirror 7A having a paraboloid of revolution is disposed at a position at which a radio wave of the antenna AT is reflected and introduced to the wireless terminal 100A. According to a disposition structure of this IFF method, not only a distance between the antenna AT and the wireless terminal 100A can be shortened, but also an area of plane waves expands from a distance immediately after reflection on a mirror surface of the reflecting mirror 7A, so that it is possible to reduce the power loss. The power loss can be expressed by a phase difference between waves having the same phase. The phase difference permitted as the power loss is, for example, λ/16. The phase difference is assumed to be evaluated by, for example, a vector network analyzer (VNA).

Figure 8:
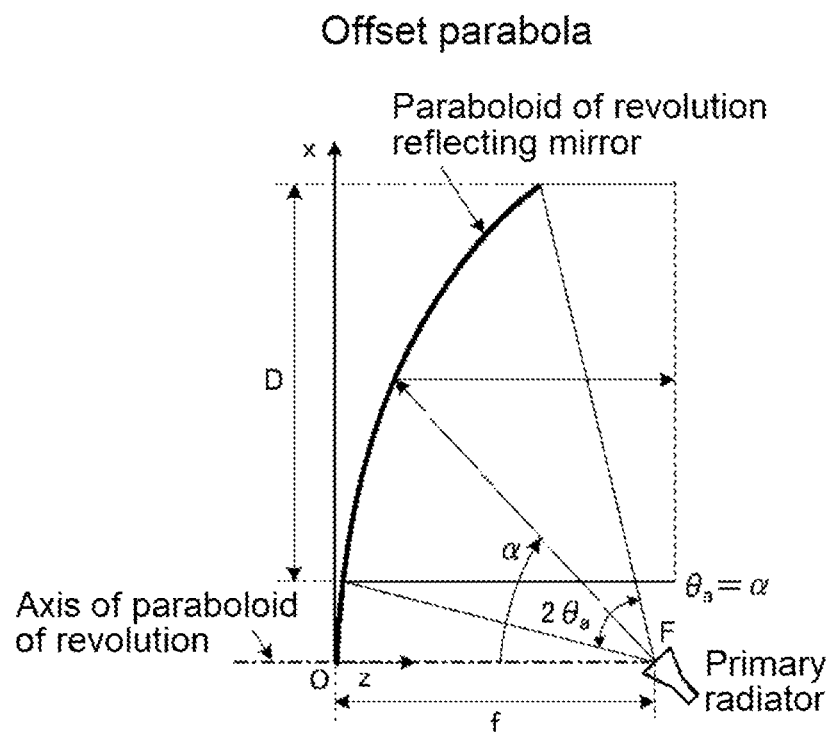
FIG. 8 is a schematic diagram illustrating a signal path structure of an offset parabola having a paraboloid of revolution in the same manner as that of the reflector adopted in the OTA chamber of the measurement apparatus according to the embodiment of the present invention.

An example of using the reflecting mirror 7A illustrated in FIG. 6B includes a parabola (see FIG. 7) or an offset parabola (see FIG. 8). As illustrated in FIG. 7, the parabola has a mirror surface (a paraboloid of revolution) symmetric based on an axis passing through an antenna center O, and has a function of reflecting a radio wave radiated from a primary radiator in a direction parallel to a direction of the axis by installing the primary radiator having directivity in a direction of the paraboloid of revolution at the focal position F determined from the paraboloid of revolution. On the other hand, it can be understood that the parabola reflects a radio wave (for example, a radio signal transmitted by the DUT 100) incident on the paraboloid of revolution in the direction parallel to the axial direction and guides the radio wave to the test antenna 5 by disposing the test antenna 5 according to the present embodiment at the focal position F, for example. Meanwhile, the parabola has a perfect circular shape when viewed from the front (a Z direction), and has a large structure and is not suitable for being disposed as the reflector 7 of the OTA chamber 50.

On the other hand, as illustrated in FIG. 8, the offset parabola has a mirror surface asymmetric based on an axis of a paraboloid of revolution (a shape obtained by cutting out a part of a paraboloid of revolution of the perfect circle type parabola (see FIG. 7)). By installing a primary radiator having a beam axis inclined at an angle α, for example, with respect to the axis of the paraboloid of revolution, the offset parabola has a function of reflecting radio waves radiated from the primary radiator in a direction parallel to the axial direction of the paraboloid of revolution. It can be understood that, by disposing, for example, the test antenna 5 according to the present embodiment at the focal position F, the offset parabola can reflect radio waves (for example, radio signals transmitted from the DUT 100) incident on the paraboloid of revolution in a direction parallel to the axial direction of the paraboloid of revolution so that the radio waves are guided to the test antenna 5. Since the offset parabola can be disposed so that the mirror surface is almost vertical, the structure is much smaller than the parabola (see FIG. 7).

Based on the test result described above, in the OTA chamber 50 according to the present embodiment, as illustrated in FIG. 1, the reflector 7 using the offset parabola (see FIG. 8) is disposed in a radio wave propagation path between the DUT 100 and the test antenna 5. The reflector 7 is attached to the side surface 52b of the housing main body 52 so that a position indicated by the reference numeral F in FIG. 1 is the focal position.

The reflector 7 and the test antenna 5 are in an offset state in which a beam axis BS1 of the test antenna 5 is inclined by a predetermined angle α with respect to an axis RS1 of the reflector 7. The reflector 7 has the focal position F on the beam axis BS1 of the test antenna 5, and the test antenna 5 can pass through the focal position F of the reflector 7. The inclination angle α described above can be set to, for example, 30 degrees. In this case, the test antenna 5 is held so as to face the reflector 7 at an elevation angle of 30 degrees, that is, so as to face the reflector 7 at an angle at which a receiving surface of the test antenna 5 is perpendicular to the beam axis of the radio signal. By adopting the offset parabola type reflector 7, the reflector 7 itself can be made small. Therefore, since it is possible to dispose the reflector 7 in such a posture that the mirror surface is almost vertical, there is a merit that the structure of the OTA chamber 50 can be reduced.

Figure 9:
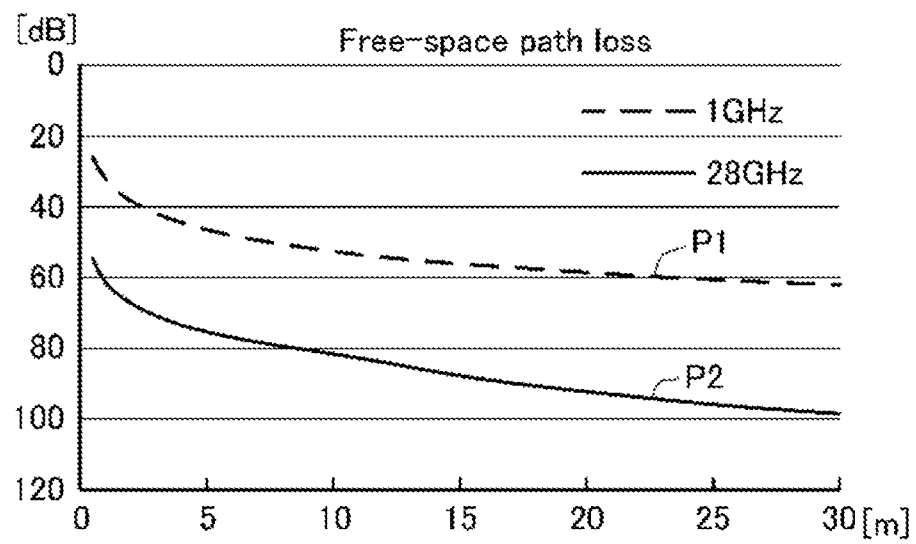
FIG. 9 is a diagram illustrating a characteristic of a power loss in an antenna disposed in a far field measurement area from a wireless terminal.

Here, a power loss in a disposition structure of the DFF method illustrated in FIG. 6A and a disposition structure of the IFF method illustrated in FIG. 6B will be verified. FIG. 9 illustrates a characteristic of a power loss when the antenna AT is disposed at a distance in the far-field measurement area from the wireless terminal 100A, for example, as illustrated in FIGS. 6A and 6B. In FIG. 9, P1 indicates a characteristic of a power loss by the antenna AT using a radio signal in the 1 GHz bandwidth, and P2 indicates a characteristic of a power loss characteristic by the antenna AT using a radio signal in a millimeter wave bandwidth (28 GHz bandwidth).

In the characteristics illustrated in FIG. 9, in particular, focusing on the characteristic of the power loss of the radio signal in the millimeter wave bandwidth used by the antenna 110 of the DUT 100 which is a target to be measured by the measurement apparatus 1 according to the present embodiment (the characteristic indicated by P2 in FIG. 9), in the disposition structure of the DFF method illustrated in FIG. 6A, a distance from the wireless terminal 100A to the far field area, for example, a power loss in a case where the antenna AT is disposed at a position of 30 m is, for example, a value of approximately 100 dB.

On the other hand, in the disposition structure of the IFF method illustrated in FIG. 6B, a distance from the wireless terminal 100A to the far field area, for example, a power loss in a case where the antenna AT is disposed at a position of 1 m is, for example, a value of approximately 62 dB. Therefore, it is clear that the power loss can be suppressed in the disposition structure of the IFF method as compared with the disposition structure of the DFF method.

In the description of the power loss based on FIGS. 6A, 6B, and 9, as compared with the disposition structure of the DFF method (see FIG. 6A), in the disposition structure of the IFF method (see FIG. 6B), the power loss can be reduced to, for example, approximately 62 dB, but the power loss is still large. In other words, in the measurement in the far field area, it is clear that there is a limit for shortening the distance between the antenna AT and the antenna 110 of the wireless terminal 100A, and thus it is inevitable that a certain amount of power loss occurs.

Figure 10:
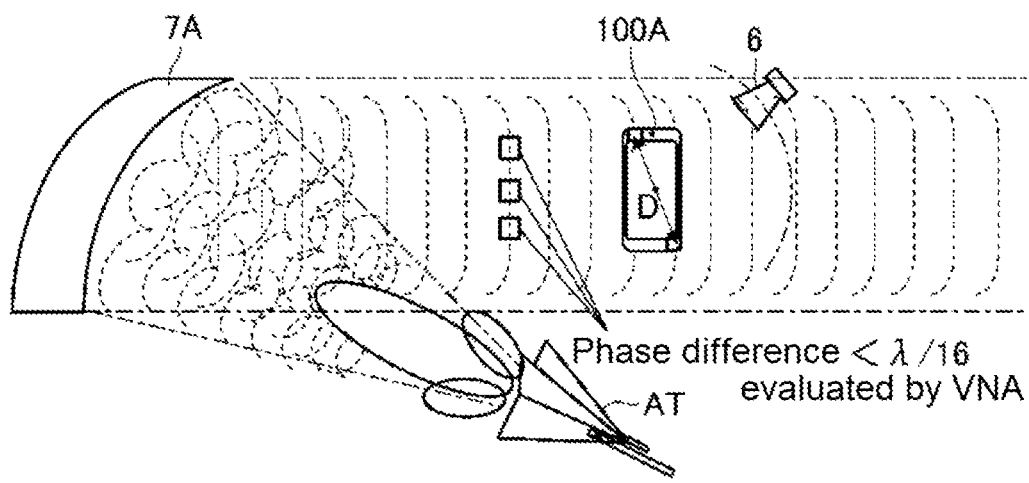
FIG. 10 is a schematic diagram illustrating a disposition mode of measurement antennas for realizing near field measurement of a spurious signal in the measurement apparatus according to the present embodiment.

The inventor of the present application discloses to dispose a spurious measurement antenna 6 in the internal space 51 of the OTA chamber 50 at a distance from the DUT 100 to the near field measurement area, for example, as illustrated in FIG. 10. A specific position at which the antenna 6 is disposed is determined to a position as illustrated in FIG. 11, for example.

Figure 11:
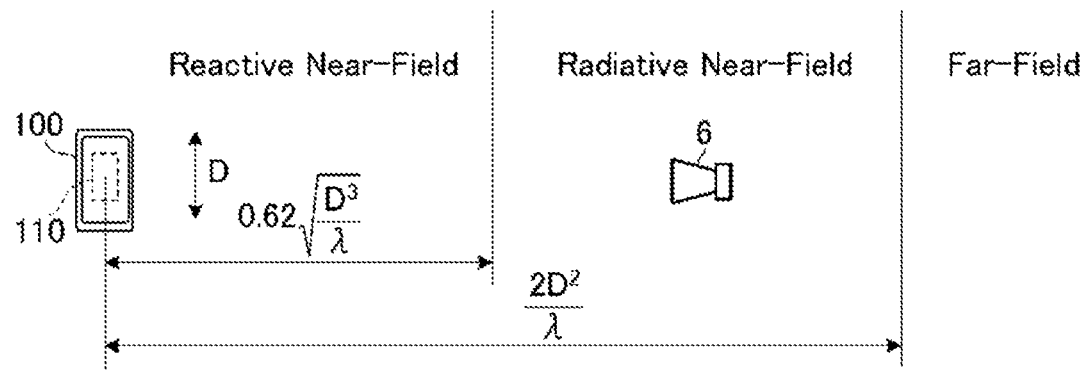
FIG. 11 is a schematic diagram for explaining an area related to disposition of a DUT and a spurious measurement antenna in the OTA chamber of the measurement apparatus according to the embodiment of the present invention.

FIG. 11 is a schematic diagram for explaining an area the DUT 100 and the antennas 6A, 6B, 6C, and 6D in the OTA chamber 50 of the measurement apparatus 1 according to the present embodiment. As illustrated in FIG. 11, as areas obtained by classification according to the distance from the DUT 100 include a reactive near field area adjacent to the DUT 100, and a radiative near field area extending beyond the reactive near field area up to a distance less than the far field area.

In the OTA chamber 50 (see FIGS. 1 and 2) of the measurement apparatus 1 according to the present embodiment, it is assumed that the spurious measurement antenna 6 is disposed in the radiative near field area exceeding the reactive near field area from the DUT 100 and less than the distance of the far field area, in FIG. 11. For example, the number of disposed antennas 6A, 6B, 6C, and 6D is four.

In FIG. 11, when a maximum straight line size of the DUT 100 is D and a wavelength of a radio signal used by the antenna 110 is λ, the reactive near field area corresponds to an area from the DUT 100 to a distance of the following.

$$0.62\sqrt{\frac{D^3}{\lambda}}$$

At this time, the far field area corresponds to an area up to a distance of $2D^2/\lambda$ as described above.

In the OTA chamber 50 of the measurement apparatus 1 according to the present embodiment, it is desired that all of the four antennas 6A, 6B, 6C, and 6D are disposed at positions with a distance R satisfying the condition indicated in the following equation (1) at the same distance from the DUT 100 (see FIG. 12).

$$0.62\sqrt{\frac{D^3}{\lambda}} < R < \frac{2D^2}{\lambda} \tag{1}$$

Figure 12:
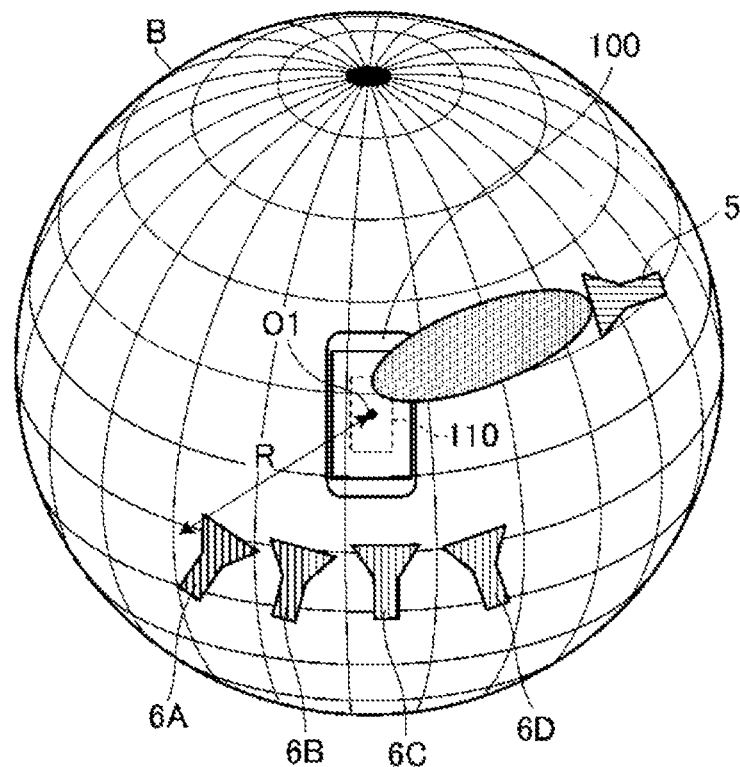
FIG. 12 is a schematic diagram three-dimensionally illustrating a disposition mode of the spurious measurement antenna in the OTA chamber of the measurement apparatus according to the embodiment of the present invention.

FIG. 12 is a schematic diagram three-dimensionally illustrating a disposition mode of the antennas 6A, 6B, 6C, and 6D in the OTA chamber 50 of the measurement apparatus 1 according to the present embodiment. In FIG. 12, a sphere B can define a spherical coordinate system (γ, θ, φ) to be described below (see FIGS. 13A and 13B), and each point at which each of the antennas 6A, 6B, 6C, and 6D is disposed on a surface of the sphere B is present at a position of a certain distance R from a center O1 of the spherical coordinate system (γ, θ, φ). The distance R is a value satisfying the above equation (1). In this manner, in the internal space 51 of the OTA chamber 50, when a position of the antenna 110 of the DUT 100 is a position corresponding to the center O1 of the sphere B in FIG. 12, each of the antennas 6A, 6B, 6C, and 6D is disposed at each distance from the center O1 in the near field measurement area.

Figure 13A:
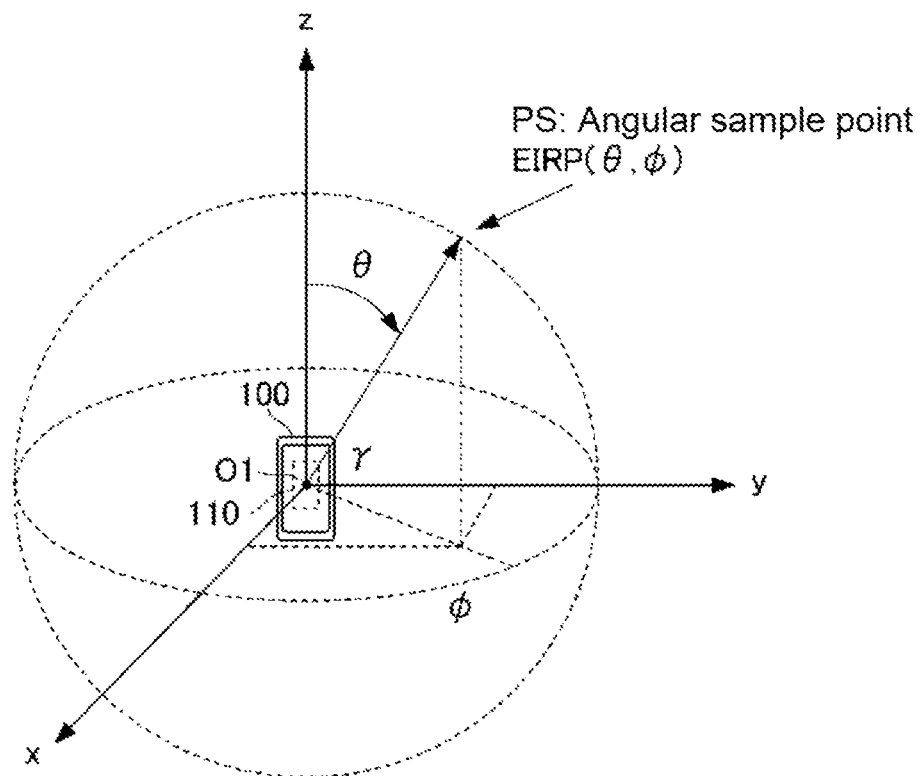
FIGS. 13A and 13B are schematic diagrams for explaining a principle of near field measurement of a spurious signal in the measurement apparatus according to the embodiment of the present invention.
Figure 13B:
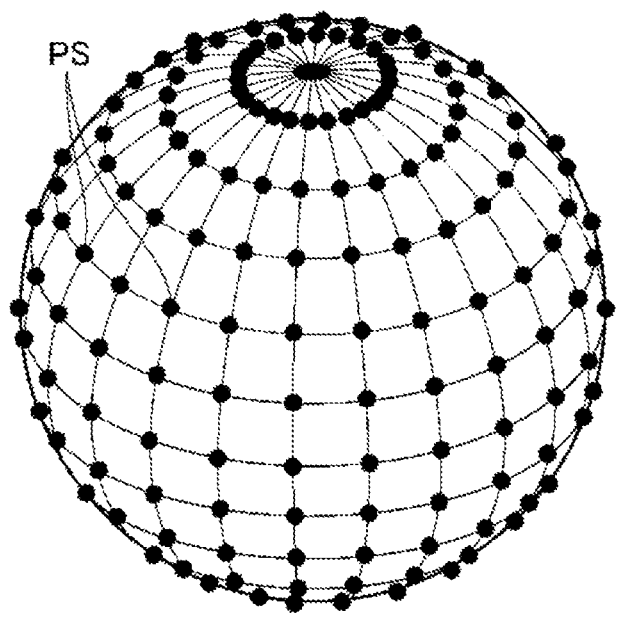

FIGS. 13A and 13B are schematic diagrams for explaining a near field measurement principle for a spurious signal radiated from the DUT 100 under a performance test in the OTA chamber of the measurement apparatus 1 according to the present embodiment. FIG. 13A is a diagram illustrating a spherical coordinate system related to total spherical scanning of the DUT 100, and FIG. 13B is a diagram illustrating distribution of angle sample points PS in the spherical coordinate system.

In general, regarding radiated power measurement for the DUT 100, a method of measuring equivalent isotropically radiated power (EIRP) and a method of measuring total radiated power (TRP) are known. The EIRP is, for example, a power value measured at each measurement point (θ, φ) in the spherical coordinate system (γ, θ, φ) illustrated in FIG. 13A. On the other hand, the TRP is a value obtained by measure the EIRP at a plurality of predetermined angle sample points PS (see FIG. 13B) on a spherical surface (corresponding to a surface of the sphere B in FIG. 12) with the same distance from all orientations of the spherical coordinate system (γ, θ, φ), that is, the center O1 (hereinafter, a reference point) of total spherical scanning of the DUT 100 and calculating a total sum of the EIRPs, and is referred to as Ptrp.

The total radiation power Ptrp can be expressed by, for example, the following equation (2), where the number of divisions in θ and φ directions of the spherical coordinate system (γ, θ, φ) are respectively Nθ and Nφ.

$$P_{TRP} = \frac{1}{4\pi}\sum_{j=1}^{N_\phi}\sum_{i=2}^{N_\theta} EIRP(\theta_i, \phi_j)\sin\theta_i \Delta\theta\Delta\phi \tag{2}$$

Further, the number of angle samples (N) from which the total radiation power Ptrp can be calculated based on the above equation (2) can be obtained by the following equation (3).

$$N=(N\theta-1)\times N\phi \tag{3}$$

In the present embodiment, the division numbers Nθ and Nφ for calculating the total radiated power Ptrp are respectively set to 12, for example. Accordingly, in the present embodiment, the number of angle samples (N) is obtained as N=132 (=(12−1)×12) by the above equation (3). The 132 angle sample points PS obtained in this manner are positioned on the surface of the sphere B as illustrated in FIG. 13B.

In the measurement apparatus 1 according to the present embodiment, for example, 132 (=(12−1)×12) as illustrated in FIG. 13B is given as the angle sample points PS, and the EIRP is measured at positions of 132 points with the same distance from the reference point of the spherical coordinate system (γ, θ, φ), and the EIRPs at all point positions are added. Based on an addition result of the respective EIRPs, that is, a total sum of the EIRPs at all the angle sample points PS of 132 points, spurious measurement for obtaining the total radiated power Ptrp of the DUT 100 is performed.

At the time of the spurious measurement, the integrated control device 10 controls driving of the DUT scan mechanism 56 so as to execute total spherical scanning of the DUT 100. In the total spherical scanning of the DUT 100, the integrated control device 10 rotationally drives the turntable 56a around an azimuth shaft while repeating driving/non-driving of the driving motor 56f, while the integrated control device 10 rotationally drives the placement tray 56d around a roll shaft while repeating driving/non-driving of the driving motor 56g. At that time, the integrated control device 10 performs control so that the driving motor 56f and the driving motor 56g are not driven at every timing when an antenna surface of the antenna 110 faces one angle sample point PS. According to the control of the total spherical scanning for the DUT 100, while the antenna 110 is held at a position of the reference point which is a center of the sphere B defining the spherical coordinate system ($\gamma$, $\theta$, $\varphi$), the DUT 100 placed on the placement tray 56d is rotationally driven around the reference point so that an antenna surface of the antenna 110 sequentially faces (directs) all the angle sample points PS of the sphere B.

The four antennas 6A, 6B, 6C, and 6D are respectively disposed to be separated from each other in a direction of angle $\varphi$ at positions of specific four angle sample points PS in the spherical coordinate system ($\gamma$, $\theta$, $\varphi$) (see FIG. 12). In the total spherical scanning described above, the DUT 100 is driven (scanned) so that the antenna surface of the antenna 110 sequentially faces each light receiving surface of the four antennas 6A, 6B, 6C, and 6D. Accordingly, the four antennas 6A, 6B, 6C, and 6D can respectively receive a radio signal in a spurious frequency bandwidth radiated from the antenna 110 of the DUT 100 on which the total spherical scanning is performed (under the performance test).

Further, the integrated control device 10 controls of driving of each of the signal analysis devices 30A, 30B, 30C, and 30D in accordance with the total spherical scanning of the DUT 100 and controls each of the signal analysis devices 30A, 30B, 30C, and 30D so as to execute a near field measurement process based on each of reception signals input from the four antennas 6A, 6B, 6C, and 6D respectively corresponding to the signal analysis devices 30A, 30B, 30C, and 30D.

At that time, in the spherical coordinate system ($\gamma$, $\theta$, $\varphi$) illustrated in FIG. 13B, the integrated control device 10 respectively controls the signal analysis devices 30A, 30B, 30C, and 30D so that as the DUT 100 is scanned so as to pass through each angle sample point PS in the $\varphi$ direction with a certain $\theta$ angle being maintained, the EIRP is sequentially measured at each angle sample point PS. By executing such the EIRP measurement control in accordance with the total spherical scanning of the DUT 100 passing through all angle sample points PS by changing the angle of $\theta$, each of the signal analysis devices 30A, 30B, 30C, and 30D can measure the EIRP at all the angle sample points PS in the spherical coordinate system ($\gamma$, $\theta$, $\varphi$). Further, the integrated control device 10 can obtain the TRP (the Ptrp) which is a sum of EIRP measurement values for all the angle sample points PS.

Based on the above description, returning to FIG. 3 and FIGS. 4A and 4B, a functional configuration of the measurement apparatus 1 according to the present embodiment will be described again. In the measurement apparatus 1 according to the present embodiment, the integrated control device 10 has, for example, the functional configuration illustrated in FIG. 3, and the NR system simulator 20 and the signal analysis devices 30A, 30B, 30C, and 30D respectively have the functional configuration illustrated in FIGS. 4A and 4B, for example.

As illustrated in FIG. 3, the integrated control device 10 includes a control unit 11, an operation unit 12, and a display unit 13. The control unit 11 is configured by a computer device, for example. The computer device is a central processing unit (CPU) 11a which performs a predetermined information process for realizing a functions of the measurement apparatus 1 and performs overall control on the NR system simulator 20 and the signal analysis devices 30A, 30B, 30C, and 30D, a read only memory (ROM) 11b which stores an operating system (OS) for starting up the CPU 11a, other programs, control parameters, and the like, a random access memory (RAM) 11c which stores the OS, an execution code of an application, data, or the like used by the CPU 11a for an operation, an external interface (I/F) unit lid having an input interface function for inputting a predetermined signal and an output interface function for outputting a predetermined signal, a non-volatile storage medium such as a hard disk device (not illustrated), and various input and output ports.

The external I/F unit lid is communicably connected to the NR system simulator 20, the signal analysis devices 30A, 30B, 30C, and 30D, and the driving unit 56e of the DUT scan mechanism (two-shaft positioner) 56 via the network 19, respectively. The operation unit 12 and the display unit 13 are connected to the input and output port. The operation unit 12 is a functional unit for inputting various types of information such as a command or the like, and the display unit 13 is a functional unit for displaying various pieces of information such as an input screen of the various pieces of information, a measurement result, or the like.

The computer device described above functions as the control unit 11 when the CPU 11a executes a program stored in the ROM 11b using the RAM 11c as a work area. As illustrated in FIG. 3, the control unit 11 includes a call connection control unit 14, a signal transmission and reception control unit 15, the DUT scan control unit 16, and a signal analysis device control unit 17. The call connection control unit 14, the signal transmission and reception control unit 15, the DUT scan control unit 16, and the signal analysis device control unit 17 are also realized by the CPU 11a executing a predetermined program stored in the ROM 11b into the work area of the RAM 11c.

The call connection control unit 14 drives the test antenna 5 via the NR system simulator 20 and the signal processing unit 25 to transmit and receive a control signal (a radio signal) to and from the DUT 100, so that the NR system simulator 20 and the DUT 100 performs control to establish a call between the NR system simulator 20 and the DUT 100 (a state in which a radio signal can be transmitted and received).

The signal transmission and reception control unit 15 monitors a user operation in the operation unit 12. When a predetermined measurement start operation related to measurement of transmission and reception characteristics of the DUT 100 is performed by a user, the signal transmission and reception control unit 15 transmits a signal transmission command to the NR system simulator 20 after the call is established by the call connection control, performs control of transmitting a test signal from the NR system simulator 20 via the test antenna 5, and performs control of transmitting a signal reception command and receiving a signal under measurement via the test antenna 5.

The DUT scan control unit 16 controls the driving motors 56f and 56g of the DUT scan mechanism 56 to perform total spherical scanning on the DUT 100 placed on the placement tray 56d of the DUT placement unit 56c. In order to realize this control, for example, a DUT scan control table 16a is prepared in advance in the ROM 11b. The DUT scan control table 16a stores, for example, coordinates of each angle sample point PS (see FIG. 13B) in the spherical coordinate system (see FIG. 13A) related to the total spherical scanning for the DUT 100, driving data of the driving motors 56f and 56g associated with the coordinates of each angle sample point PS, and control data associated with a stop time (a measurement time) or the like at each angle sample point PS. In a case where the driving motors 56f and 56g are stepping motors, for example, the number of driving pulses is stored as the driving data.

The DUT scan control unit 16 expands the DUT scan control table 16a into a work area of the RAM 11c, and controls driving of the driving motors 56f and 56g of the DUT scan mechanism 56 based on the control data stored in the DUT scan control table 16a. Accordingly, the total spherical scanning for the DUT 100 placed on the DUT placement unit 56c is performed. In the total spherical scanning, for each angle sample point PS in the spherical coordinate system, an operation in which the antenna surface of the antenna 110 of the DUT 100 is stopped for a specified time (the above stop time) toward the angle sample point PS, and then moves to the next angle sample point PS (scanning on DUT 100) is sequentially performed for all the angle sample points PS.

During the total spherical scanning of the DUT 100, the signal analysis device control unit 17 respectively controls the signal analysis devices 30A, 30B, 30C, and 30D based on a radio signal received from each of the antennas 6A, 6B, 6C, and 6D so that the near field measurement process of measuring power of a radio signal in a spurious frequency bandwidth radiated from the antenna 110 of the DUT 100 is performed.

Figure 4A:
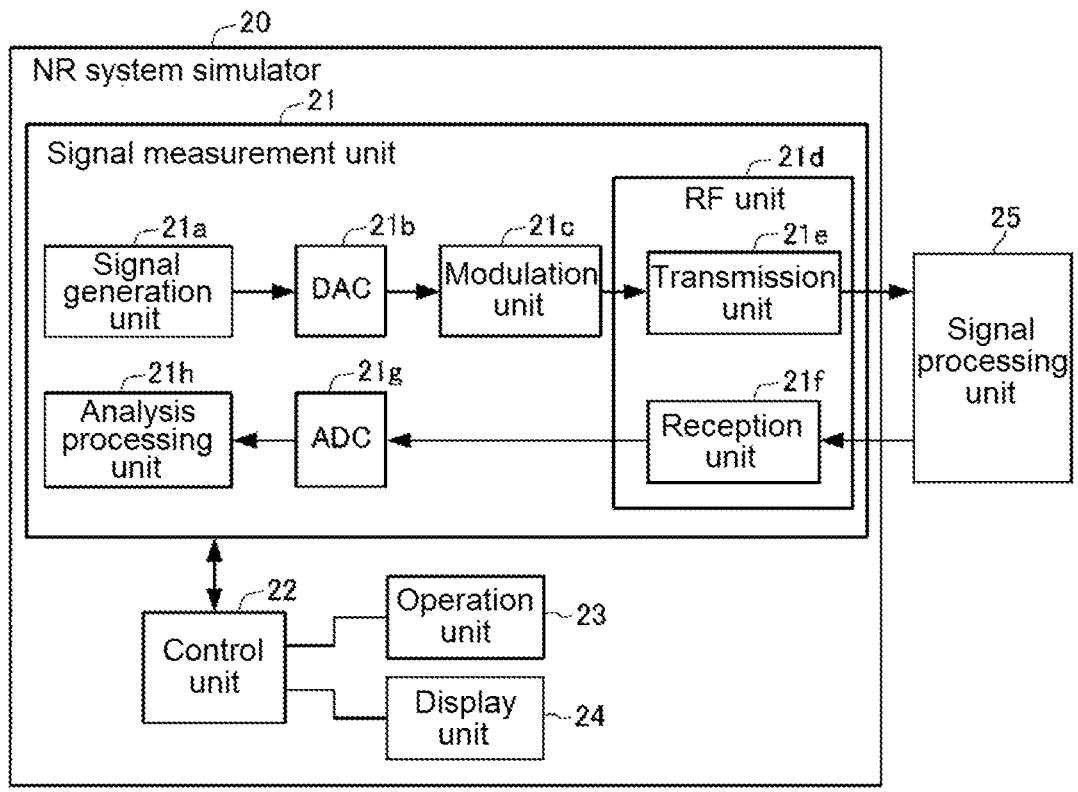
FIGS. 4A and 4B are block diagrams illustrating a functional configuration of an NR system simulator and a signal analysis device in the measurement apparatus according to the embodiment of the present invention.

As illustrated in FIG. 4A, the NR system simulator 20 includes a signal measurement unit 21, a control unit 22, an operation unit 23, and a display unit 24. The signal measurement unit 21 includes a signal generation function unit having a signal generation unit 21a, a digital/analog converter (DAC) 21b, a modulation unit 21c, a transmission unit 21e of an RF unit 21d and a signal analysis function unit having a reception unit 21f of the RF unit 21d, an analog/digital converter (ADC) 21g, and an analysis processing unit 21h.

In the signal generation function unit of the signal measurement unit 21, the signal generation unit 21a generates waveform data having a reference waveform, specifically, for example, an I component baseband signal and a Q component baseband signal which is an orthogonal component signal of the I component baseband signal. The DAC 21b converts waveform data (I component baseband signal and Q component baseband signal) having a reference waveform output from the signal generation unit 21a from a digital signal to an analog signal and outputs the analog signal to the modulation unit 21c. The modulation unit 21c performs a modulation process of mixing a local signal with respect to each of the I component baseband signal and the Q component baseband signal, and further synthesizing both to output the result as a digital modulation frequency. The RF unit 21d generates a test signal in which the digital modulation frequency output from the modulation unit 21c corresponds to a frequency of each communication standard, and outputs the generated test signal to the signal processing unit 25 by the transmission unit 21e. The signal processing unit 25 performs a process such as frequency conversion (for example, up-conversion), amplification, frequency selection, or the like on the test signal input from the transmission unit 21e, and then outputs the test signal toward the DUT 100 by using the test antenna 5.

Thereafter, the test antenna 5 receives a signal under measurement transmitted by the DUT 100 which receives the test signal, and outputs the received signal under measurement to the signal processing unit 25. The signal processing unit 25 performs each process such as frequency conversion (for example, down-conversion), amplification, frequency selection, or the like on the signal under measurement input from the test antenna 5, and then outputs the processed signal under measurement to the NR system simulator 20.

In the NR system simulator 20, the signal under measurement transmitted from the signal processing unit 25 is processed by the signal analysis function unit of the signal measurement unit 21. In this process, first, the RF unit 21d receives the signal under measurement by the reception unit 21f, and then converts the signal under measurement into a signal in an intermediate frequency bandwidth (an IF signal) by mixing the signal under measurement with a local signal. The ADC 21g converts the signal under measurement converted into the IF signal by the reception unit 21f of the RF unit 21d, from an analog signal to a digital signal and outputs the converted signal to the analysis processing unit 21h.

The analysis processing unit 21h generates pieces of waveform data respectively corresponding to the I component baseband signal and the Q component baseband signal by the digital process on the signal under measurement, which is a digital signal output from the ADC 21g, and then performs a process of analyzing the I component baseband signal and the Q component baseband signal based on the waveform data.

In the same manner as the control unit 11 of the integrated control device 10 described above, the control unit 22 is configured by a computer device including, for example, a CPU, a RAM, a ROM, and various input/output interfaces. The CPU performs a predetermined information process and control for realizing the functions of the signal generation function unit, the signal analysis function unit, the operation unit 23, and the display unit 24.

The operation unit 23 and the display unit 24 are connected to the input/output interface of the computer device. The operation unit 23 is a functional unit for inputting various types of information such as a command or the like, and the display unit 24 is a functional unit for displaying various pieces of information such as an input screen of the various pieces of information, a measurement result, or the like. The NR system simulator 20 and the signal processing unit 25 having the above-described configuration constitute a simulation measurement apparatus according to the present invention.

Figure 4B:
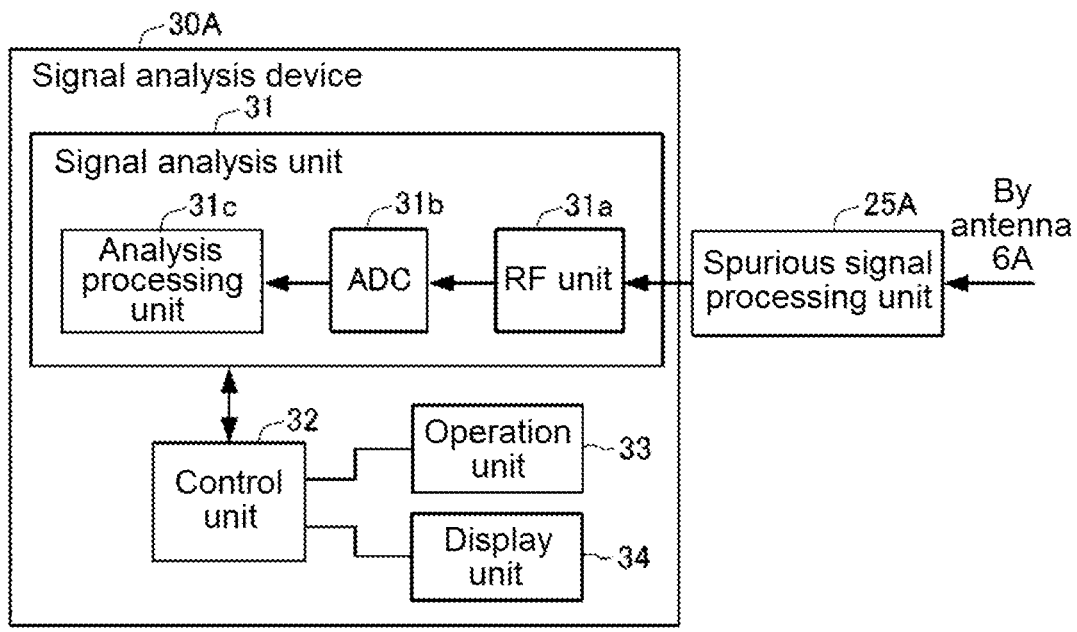

Further, in the measurement apparatus 1 according to the present embodiment, as illustrated in FIG. 4B, the signal analysis devices 30A, 30B, 30C, and 30D include a signal analysis unit 31, a control unit 32, an operation unit 33, and a display unit 34. All of the signal analysis devices 30A, 30B, 30C, and 30D have the same configuration. In addition, types of input signals (reception signals of the respective antennas 6A, 6B, 6C, and 6D) are the same, and the processing operations are also the same. In the following, a configuration (see FIG. 4B) and an operation of the signal analysis device 30A will be described as a representative.

As illustrated in FIG. 4B, in the signal analysis device 30A, the signal analysis unit 31 includes an RF unit 31a, an ADC 31b, and an analysis processing unit 31c, and performs a signal analysis process on a spurious signal input from a spurious signal processing unit 25A. Here, the spurious signal input from the spurious signal processing unit 25A is a reception signal by an antenna 6A in the OTA chamber 50. In the signal analysis device 30A, the signal analysis unit 31 performs a measurement process on the reception signal of the antenna 6A input from the spurious signal processing unit 25A. In the same manner, the signal analysis devices 30B, 30C, and 30D also perform the measurement process on the reception signals of the antennas 6B, 6C, and 6D respectively input from spurious signal processing units 25B, 25C, and 25D.

Each of the spurious signal processing units 25A, 25B, 25C, and 25D includes a down converter, an amplifier, and a frequency filter. The spurious signal processing units 25A, 25B, 25C, and 25D respectively perform frequency conversion, amplification, and frequency selection on radio signals (spurious signals) in the respective division frequency bandwidths received by the antennas 6A, 6B, 6C, and 6D, and respectively transmit the radio signals to the RF units 31a of the signal analysis units 31 in the signal analysis devices 30A, 30B, 30C, and 30D. The signal analysis devices 30A, 30B, 30C, and 30D may be configured to incorporate the spurious signal processing units 25A, 25B, 25C, and 25D, respectively. The signal analysis devices 30A, 30B, 30C, and 30D and the spurious signal processing units 25A, 25B, 25C, and 25D constitute near field measurement processing means in the present invention.

In the related art, since only one antenna can be disposed in the OTA chamber 50, an antenna replacement operation is performed for each division frequency, and there is one signal analysis device and a spurious signal processing unit, measurement is performed by repeating total spherical scanning four times for each four division frequencies. In the present embodiment, the spurious signal processing units 25A, 25B, 25C, and 25D and the signal analysis devices 30A, 30B, 30C, and 30D are provided in plural for each division frequency in this manner, so that it is possible to simultaneously measure spurious signals having four division frequencies in one total spherical scanning. In this manner, a measurement time is ¼ as compared with the related art, and it is possible to shorten the measurement time.

Figure 14:
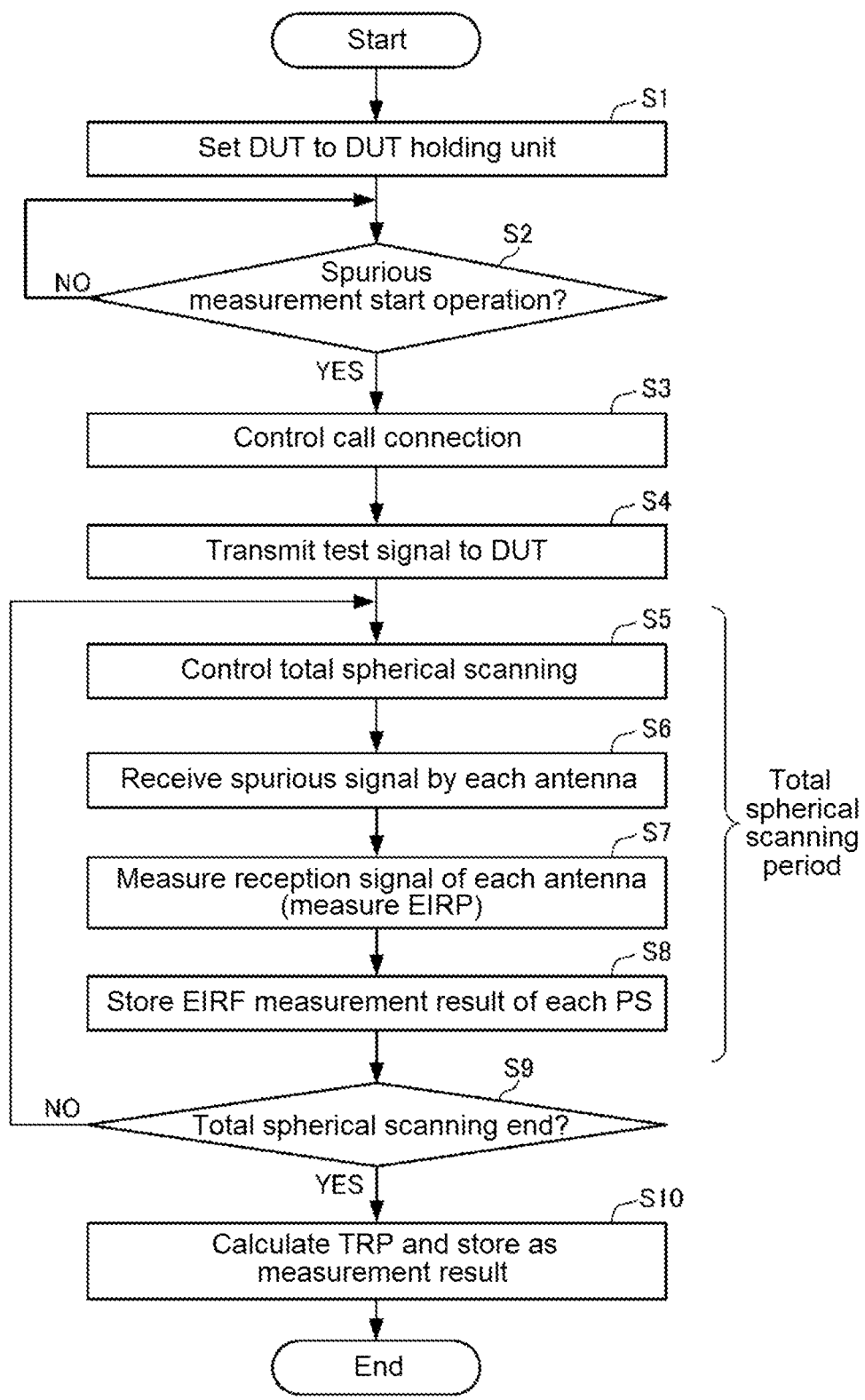
FIG. 14 is a flowchart illustrating a control operation for a spurious measurement process of the DUT by the integrated control device of the measurement apparatus according to the embodiment of the present invention.

Next, a spurious measurement process in the measurement apparatus 1 according to the present embodiment will be described with reference to FIG. 14. FIG. 14 illustrates a case where spurious signals having respective different division frequency bandwidths corresponding to the four antennas 6A, 6B, 6C, and 6D are measured by using the antennas 6A, 6B, 6C, and 6D. Further, FIG. 14 illustrates a case where a spurious measurement start operation of instructing to start spurious measurement is performed by the operation unit 12 of the integrated control device 10. The spurious measurement start operation may be performed by each operation unit 33 of the signal analysis devices 30A, 30B, 30C, and 30D.

In order to perform spurious measurement in the measurement apparatus 1, first, it is necessary to set the DUT 100 in the internal space 51 of the OTA chamber 50. In the measurement apparatus 1, as a first process of spurious measurement, a user performs an operation of setting the DUT 100 to be tested on the DUT placement unit 56c of the DUT scan mechanism 56 of the OTA chamber 50 (step S1).

After the setting operation of the DUT 100 is performed, in the integrated control device 10, for example, the call connection control unit 14 monitors whether or not a spurious measurement start operation is performed in the operation unit 12 (step S2).

In a case where it is determined that the spurious measurement start operation is not performed (NO in step S2), the call connection control unit 14 continues the monitoring in step S1. On the other hand, in a case where it is determined that the spurious measurement start operation is performed (YES in step S2), the call connection control unit 14 uses the test antenna 5, and transmits and receives a control signal (a radio signal) to and from the DUT 100 so as to execute call connection control (step S3).

Here, the NR system simulator 20 performs call connection control to wirelessly transmit a control signal (a call connection request signal) to the DUT 100 via the test antenna 5 and receive a control signal (a call connection response signal) transmitted after setting a connection-requested frequency by the DUT 100 which receives the call connection request signal. According to the call connection control, a state in which a radio signal in a specified frequency bandwidth can be transmitted and received via the test antenna 5 disposed at the focal position F of the reflector 7 and the reflector 7 is established between the NR system simulator 20 and the DUT 100. Thereafter, the NR system simulator 20 and the DUT 100 can transmit and receive a radio signal for a performance test of the DUT 100.

In the transmission and reception of the radio signal for the performance test, on the DUT 100 side, a process for receiving a radio signal transmitted from the NR system simulator 20 via the test antenna 5 and the reflector 7 is a downlink (DL) process, and conversely, a process for transmitting a radio signal to the NR system simulator 20 via the reflector 7 and the test antenna 5 is an uplink (UL) process. The test antenna 5 is used to perform a process of establishing a link (call) and a process of downlink (DL) and uplink (UL) after the link establishment, and may be referred to as a link antenna.

After establishing the call connection in step S3, the signal transmission and reception control unit 15 transmits a signal transmission command to the NR system simulator 20. Based on the signal transmission command, the NR system simulator 20 performs control to transmit a test signal to the DUT 100 via the test antenna 5 (step S4).

Here, the test signal transmission control is performed as follows by the NR system simulator 20. In the NR system simulator 20 (see FIG. 4A), the control unit 22 which receives the signal transmission command described above controls the signal generation function unit so as to generate a signal for generating a test signal in the signal generation unit 21a. Thereafter, this signal is digital/analog conversion-processed by the DAC 21b and modulation-processed by the modulation unit 21c. Then, the RF unit 21d generates a test signal in which the digitally modulated frequency corresponds to a frequency of each communication standard, and the transmission unit 21e outputs the test signal to the DUT 100 via the signal processing unit 25 and the test antenna 5. The signal transmission and reception control unit 15 starts the test signal transmission in step S4, and then perform control of continuedly transmitting the test signal until step S9 when the spurious measurement corresponding to each division frequency bandwidth of the spurious frequency bandwidth to be measured is terminated.

After starting the transmission of the test signal in step S4, in the NR system simulator 20, the control unit 22 performs control to measure a signal under measurement transmitted from the antenna 110 of the DUT 100 which receives the test signal. In this control, the signal under measurement received via the test antenna 5 is input to the reception unit 21f of the RF unit 21d in the NR system simulator 20 (see FIG. 4A). In the NR system simulator 20, the control unit 22 controls the signal generation function unit, and first converts the signal under measurement input to the reception unit 21f of the RF unit 21d into an IF signal. Next, the IF signal is converted from an analog signal into a digital signal by the ADC 21g and input to the analysis processing unit 21h, and the analysis processing unit 21h performs a process of generating pieces of waveform data respectively corresponding to an I component baseband signal and a Q component baseband signal and analyzing the I component baseband signal and the Q component baseband signal based on the waveform data.

Further, in the integrated control device 10, after the test signal transmission is started in step S4, the DUT scan control unit 16 performs control for total spherical scanning of the DUT 100 placed on the placement tray 56d of the DUT placement unit 56c in the DUT scan mechanism (two-shaft positioner) 56 (step S5). At that time, the DUT scan control unit 16 intermittently controls driving of the driving motors 56f and 56g based on the control data stored in the DUT scan control table 16a. Accordingly, the antenna surface of the antenna 110 is stopped so as to face one angle sample point PS of the sphere B (see FIG. 13B) defining the spherical coordinate system (γ, θ, φ) (see FIG. 13A) for a specified time. Thereafter, while an operation of moving the DUT 100 to the next angle sample point PS is sequentially repeated for all the angle sample points PS, the total spherical scanning is performed on the DUT 100. Thereafter, the total spherical scanning of the DUT 100 by the DUT scan control unit 16 is continuously performed during a period until step S9 (a total spherical scanning period) when the spurious measurement is terminated.

During this time, the signal analysis device control unit 17 of the integrated control device 10 performs spurious measurement control on the signal analysis devices 30A, 30B, 30C, and 30D. In this spurious measurement control, first, after step S4, reception signals of the antennas 6A, 6B, 6C, and 6D which receive a spurious signal radiated from the antenna 110 of the DUT 100 communicating with the test antenna 5 are controlled to be respectively input to the signal analysis devices 30A, 30B, 30C, and 30D via the spurious signal processing units 25A, 25B, 25C, and 25D (step S6).

Subsequently, the signal analysis device control unit 17 causes the signal analysis devices 30A, 30B, 30C, and 30D to execute a spurious measurement process based on respective input signals, that is, the reception signals of the antennas 6A, 6B, 6C, and 6D. The spurious measurement process here is a process of measuring equivalent isotropically radiated power (EIRP) corresponding to the angle sample point PS directed by each of the antenna surfaces of the antennas 6A, 6B, 6C, and 6D (step S7).

According to the control in step S7, the signal analysis device 30A obtains an EIRP value of the spurious signal of the division frequency bandwidth identified by the number 1 in FIG. 5 based on the reception signal at one angle sample point PS of the antenna 6A. In the same manner, the signal analysis devices 30B, 30C, and 30D obtain EIRP values of the spurious signals of the division frequency bandwidths respectively identified by the numbers 2, 3, and 4 in FIG. 5 based on the respective reception signals at respective one angle sample point PS of the antennas 6B, 6C, and 6D. The signal analysis device control unit 17 also performs control of storing the measurement results of the spurious signals in the four division frequency bandwidths measured by the signal analysis devices 30B, 30C, and 30D, in accordance with the respective angle sample points PS, for example, in a predetermined storage area of the RAM 11c (step S8).

Next, the signal analysis device control unit 17 determines whether or not the EIRP measurement for all the angle sample points PS is completed (step S9). Here, in a case where it is determined that the EIRP measurement for all the angle sample points PS is not completed (NO in step S9), the signal analysis device control unit 17 continues the processes from step S5.

During this time, in a case where it is determined that the EIRP measurement for all the angle sample points PS is completed (YES in step S9), the signal analysis device control unit 17 causes the signal analysis devices 30A, 30B, 30C, and 30D to respectively aggregate the EIRP measurement results based on the reception signals for all the angle sample points PS by the antennas 6A, 6B, 6C, and 6D (calculate a sum of the EIRP measurement results). Next, the signal analysis device control unit 17 executes control (the near field measurement process) of obtaining aggregate results of the EIRP measurement results for all the angle sample points PS for each of the signal analysis devices 30A, 30B, 30C, and 30D and storing the aggregate results in a TRP storage area of the RAM 11c, for example, by using the aggregate results as the total radiation power Ptrp described above (step S10).

In the process in step S10, the total radiation power Ptrp aggregated by each of the signal analysis devices 30A, 30B, 30C, and 30D are stored in the TRP storage area in accordance with the division frequency bandwidths respectively used for the antennas 6A, 6B, 6C, and 6D, for example. The stored total radiation power Ptrp can be read from the TRP storage area as necessary, and displayed on the display unit 13 of the integrated control device 10 in an appropriate display mode, for example. Regarding the process in step S10, the total radiation power Ptrp may be calculated by the signal analysis device control unit 17 based on the EIRP measurement results in the signal analysis devices 30A, 30B, 30C, and 30D.

The integrated control device 10 stores the total radiation power Ptrp measured in step S10 in the TRP storage area, and then terminates the series of spurious measurement processes described above.

As described above, the measurement apparatus (the antenna apparatus) 1 according to the present embodiment includes: the OTA chamber 50 that includes the internal space 51 not affected by a surrounding radio wave environment; the DUT scan mechanism 56 and the DUT scan control unit 16 which are scanning means that execute total spherical scanning by setting the center O1 of a spherical coordinate system as a reference point and rotatably driving the DUT 100 having the antenna 110 around the reference point as a center to sequentially face all orientations set in advance in the spherical coordinate system, in the internal space 51; the antennas 6A, 6B, 6C, and 6D that are disposed at a distance within a near field measurement range from the reference point and receives a radio signal in a spurious frequency bandwidth radiated from the antenna 110 of the DUT 100 transmitting and receiving radio signals in a specified frequency bandwidth during execution of the total spherical scanning; and the signal analysis devices 30A, 30B, 30C, and 30D that perform a near field measurement process related to power of the radio signal in the spurious frequency bandwidth, based on a reception signal of the antennas 6A, 6B, 6C, and 6D.

With this configuration, in the measurement apparatus 1 according to the present embodiment, by disposing the antennas 6A, 6B, 6C, and 6D at a distance in the near field measurement range from the reference point at which the DUT 100 is disposed, it is possible to avoid a size of the OTA chamber 50 being increased. In addition, according to the near field measurement process based on the reception signal of the antennas 6A, 6B, 6C, and 6D disposed at the distance in the near field measurement range, it is possible to perform spurious measurement with less power loss and shorter measurement time without depending on a distance between the antennas 6A, 6B, 6C, and 6D and the DUT 100.

In addition, in the measurement apparatus 1 according to the present embodiment, the signal analysis devices 30A, 30B, 30C, and 30D are configured to measure equivalent isotropically radiated power (EIRP) for all orientations set in advance in the spherical coordinate system and measures total radiated power (TRP) which is a sum of the EIRPs for all the orientations based on a reception signal of the antennas 6A, 6B, 6C, and 6D.

With this configuration, in the measurement apparatus 1 according to the present embodiment, it is possible to respectively measure the EIRPs in the spherical coordinate system in all the orientations and obtain the TRP by calculating a sum of the respective EIRPs, and it is possible to simplify the spurious measurement process by the signal analysis devices 30A, 30B, 30C, and 30D.

In addition, the measurement apparatus 1 according to the present embodiment, further includes: the plurality of antennas 6A, 6B, 6C, and 6D, in which each of the antennas 6A, 6B, 6C, and 6D uses each of radio signals in a plurality of division frequency bandwidths divided in advance of the spurious frequency bandwidth ranging from a frequency bandwidth lower than the specified frequency bandwidth to a frequency bandwidth higher than the specified frequency bandwidth, and includes the plurality of signal analysis devices 30A, 30B, 30C, and 30D, in which the plurality of signal analysis devices 30A, 30B, 30C, and 30D performs the near field measurement process for each of the plurality of division frequency bandwidths divided in advance of the spurious frequency bandwidth based on a reception signal of each of the antennas 6A, 6B, 6C, and 6D, during execution of the total spherical scanning.

With this configuration, in the measurement apparatus 1 according to the present embodiment, even in a case where the plurality of antennas 6A, 6B, 6C, and 6D are used, while maintaining compactification of the OTA chamber 50, it is possible to realize efficient spurious measurement in a wide frequency bandwidth for the DUT 100 by performing one total spherical scanning on the antenna 110 of the DUT 100 without a need to switch each of the antennas 6A, 6B, 6C, and 6D.

In addition, the measurement apparatus 1 according to the present embodiment, further includes: the test antenna 5 that uses a radio signal in the specified frequency bandwidth; and the NR system simulator 20 that outputs a test signal to the DUT 100 via the test antenna 5, receives a signal under measurement output from the DUT 100 to which the test signal is input by the test antenna 5, and performs measurement on a radio signal in the specified frequency bandwidth based on the received signal under measurement during total spherical scanning.

With this configuration, in the measurement apparatus 1 according to the present embodiment, in accordance with the performance test of the antenna 110 of the DUT 100, it is possible to efficiently perform spurious measurement for each division frequency bandwidth.

In addition, in the measurement apparatus 1 according to the present embodiment, when a maximum straight line size of the DUT 100 is D and a wavelength of a radio signal used by the antenna 110 of the DUT 100 is λ, the antennas 6A, 6B, 6C, and 6D are disposed at a position having a distance R in an area of a radiative near field from the reference point as represented by the following equation.

$$0.62\sqrt{\frac{D^3}{\lambda}} < R < \frac{2D^2}{\lambda}$$

With this configuration, in the measurement apparatus 1 according to the present embodiment, it is possible to reduce accuracy degradation related to spurious measurement when the measurement antenna is disposed too close to the reference point in the measurement system, and it is possible to realize accurate spurious measurement based on the reception signal of the antennas 6A, 6B, 6C, and 6D.

In addition, in the measurement apparatus 1 according to the present embodiment, the DUT scan mechanism 56 includes the turntable 56a that is rotatable around an azimuth shaft, the support member 56b installed on the turntable 56a in a vertical direction, the placement tray 56d that is disposed in parallel to the turntable 56a based on the support member 56b and is rotatable around a roll shaft as a center, and the driving unit 56e having the driving motor 56f which rotatably drives the azimuth shaft and the driving motor 56g which rotatably drives the roll shaft.

With this configuration, in the measurement apparatus 1 according to the present embodiment, while maintaining a simple configuration of the DUT scan mechanism 56, it is possible to easily perform the total spherical scanning on the DUT 100 by the driving unit 56e controlling the driving motors 56f and 56g as appropriate.

In addition, the measurement apparatus 1 according to the present embodiment, further includes: the reflector 7 that is accommodated in the internal space 51 of the OTA chamber 50, has a predetermined paraboloid of revolution, and reflects a radio signal transmitted or received by the antenna 110 of the DUT 100 and the test antenna 5 via the paraboloid of revolution.

With this configuration, in the measurement apparatus 1 according to the present embodiment, it is possible to reduce the distance between the test antenna 5 and the antenna 110 for the performance test of the DUT 100, and it is possible to avoid an increase in the size of the OTA chamber 50 in combination with disposition of the antennas 6A, 6B, 6C, and 6D at the distance in the near field measurement area from the reference point.

In addition, a measurement method according to the present embodiment of using the measurement apparatus 1 including each configuration described above, is configured to include: a placement step of placing the DUT 100 on the placement tray 56d of the DUT scan mechanism 56 in the OTA chamber 50 (see step S1 in FIG. 14); a test signal output step of outputting a test signal to the DUT 100 via the test antenna 5 by the NR system simulator 20 (see step S4 in FIG. 14); a total spherical scanning step of executing the total spherical scanning on the DUT 100 placed on the placement tray 56d by the DUT scan mechanism 56 and the DUT scan control unit 16 (see step S5 in FIG. 14); a signal reception step of receiving the signal under measurement and a radio signal in the spurious frequency bandwidth output from the antenna 110 of the DUT 100 to which the test signal is input, during execution of the total spherical scanning, by the antennas 6A, 6B, 6C, and 6D (see step S6 in FIG. 14); and a near field measurement process step of performing a near field measurement process related to power of the radio signal in the spurious frequency bandwidth, based on a reception signal of each the antennas 6A, 6B, 6C, and 6D in the signal reception step (see step S7 in FIG. 14).

With this configuration, in the measurement method according to the present embodiment, by disposing the antennas 6A, 6B, 6C, and 6D at the distance in the near field measurement range from the reference point at which the DUT 100 is disposed and performing the near field measurement process, while avoiding the size of the OTA chamber 50 being increased, it is possible to perform spurious measurement with less power loss and shorter measurement time without depending on the distance between the antennas 6A, 6B, 6C, and 6D and the DUT 100 (the antenna 110).

In each of the above embodiments, the example in which the spurious measurement frequency bandwidth of 6 GHz to 90 GHz (see FIG. 5) is covered by the four antennas 6A, 6B, 6C, and 6D is described, but the present invention is not limited thereto. A predetermined spurious measurement frequency bandwidth may be covered with a predetermined number of antennas 6. Further, the positions and the number of measurement sample points PS (see FIG. 13A) can be predetermined. The present invention can be applied not only to an anechoic box but also to an anechoic chamber.

As described above, the antenna apparatus and the measurement method according to the present invention have an effect that efficient spurious measurement can be realized while avoiding an increase in the size of the anechoic box and an increase of a power loss depending on the distance between the device under test (DUT) and the measurement antenna. This is useful for all kinds of antenna apparatuses and measurement methods for performing spurious measurement on a wireless terminal having high-speed communication capability such as a 5G wireless terminal or the like.

DESCRIPTION OF REFERENCE NUMERALS AND SIGNS

1: measurement apparatus (antenna apparatus)
5: test antenna
6, 6A, 6B, 6C, 6D: antenna (measurement antenna)
7: reflector
10: integrated control device
16: DUT scan control unit (scanning means)
20: NR system simulator (simulation measurement apparatus)
30A, 30B, 30C, 30D: signal analysis device (near field measurement processing means)
40A, 40B, 40C, 40D: spurious signal processing unit (near field measurement processing means)
50: OTA chamber (anechoic box)
51: internal space
56: DUT scan mechanism (scanning means)
56a: turntable
56b: columnar member
56d: placement tray (device under test (DUT) placement unit)
56e: driving unit (driving means)
56f: driving motor (first rotation driving means)
56g: driving motor (second rotation driving means)
100: DUT (device under test (DUT))
110: antenna (antenna under test)

What is claimed is:

1. An antenna apparatus comprising:
an anechoic box that includes an internal space not affected by a surrounding radio wave environment;
scanning means that sets a center of a spherical coordinate system as a reference point and rotatably drives a device under test (DUT) having an antenna under test around the reference point as a center to execute total spherical scanning, in the internal space;
a measurement antenna that receives a radio signal in a spurious frequency bandwidth radiated from the antenna under test transmitting and receiving radio signals in a specified frequency bandwidth during execution of the total spherical scanning, and is disposed at a distance within a near field measurement range from the reference point; and
near field measurement processing means that performs a near field measurement process related to power of the radio signal in the spurious frequency bandwidth, based on a reception signal of the measurement antenna.

2. The antenna apparatus according to claim 1,
wherein the near field measurement processing means measures equivalent isotropically radiated power (EIRP) in all orientations and measures total radiated power (TRP) which is a sum of the EIRPs in all the orientations based on a reception signal of the measurement antenna.

3. The antenna apparatus according to claim 1,
wherein a plurality of the measurement antennas are provided,
each of the measurement antennas uses each of radio signals in a plurality of division frequency bandwidths divided in advance of the spurious frequency bandwidth ranging from a frequency bandwidth lower than the specified frequency bandwidth to a frequency bandwidth higher than the specified frequency bandwidth, and
the near field measurement processing means performs the near field measurement process for each of the plurality of division frequency bandwidths divided in advance of the spurious frequency bandwidth based on a reception signal of each of the measurement antennas, during execution of the total spherical scanning.

4. The antenna apparatus according to claim 1, further comprising:
a test antenna that uses a radio signal in the specified frequency bandwidth; and
a simulation measurement apparatus that outputs a test signal to the device under test (DUT) via the test antenna, receives a signal under measurement output from the device under test (DUT) to which the test signal is input by the test antenna, and performs measurement on a radio signal in the specified frequency bandwidth based on the received signal under measurement, during the total spherical scanning.

5. The antenna apparatus according to claim 1,
wherein when a maximum straight line size of the device under test (DUT) is D and a wavelength of a radio signal used by the antenna under test is λ, the measurement antenna is disposed at a position having a distance R in an area of a radiative near field from the reference point as represented by the following equation.

$$0.62\sqrt{\frac{D^3}{\lambda}} < R < \frac{2D^2}{\lambda}.$$

6. The antenna apparatus according to claim 1,
wherein the scanning means includes
a turntable that is rotatable around an azimuth shaft,
a support member vertically installed on the turntable,
a device under test (DUT) placement unit that is disposed in parallel to the turntable with respect to the support member and is rotatable around a roll shaft, and
driving means that includes first rotation driving means which rotatably drives the azimuth shaft and second rotation driving means which rotatably drives the roll shaft.

7. The antenna apparatus according to claim 1, further comprising:
a reflector that is accommodated in the internal space, has a predetermined paraboloid of revolution, and reflects a radio signal transmitted or received by the antenna under test and the test antenna via the paraboloid of revolution.

8. The antenna apparatus according to claim 2,
wherein a plurality of the measurement antennas are provided,
each of the measurement antennas uses each of radio signals in a plurality of division frequency bandwidths divided in advance of the spurious frequency bandwidth ranging from a frequency bandwidth lower than the specified frequency bandwidth to a frequency bandwidth higher than the specified frequency bandwidth, and
the near field measurement processing means performs the near field measurement process for each of the plurality of division frequency bandwidths divided in advance of the spurious frequency bandwidth based on a reception signal of each of the measurement antennas, during execution of the total spherical scanning.

9. The antenna apparatus according to claim 2, further comprising:
a test antenna that uses a radio signal in the specified frequency bandwidth; and
a simulation measurement apparatus that outputs a test signal to the device under test (DUT) via the test antenna, receives a signal under measurement output from the device under test (DUT) to which the test signal is input by the test antenna, and performs measurement on a radio signal in the specified frequency bandwidth based on the received signal under measurement, during the total spherical scanning.

10. The antenna apparatus according to claim 3, further comprising:
a test antenna that uses a radio signal in the specified frequency bandwidth; and
a simulation measurement apparatus that outputs a test signal to the device under test (DUT) via the test antenna, receives a signal under measurement output from the device under test (DUT) to which the test signal is input by the test antenna, and performs measurement on a radio signal in the specified frequency bandwidth based on the received signal under measurement, during the total spherical scanning.

11. The antenna apparatus according to claim 2,
wherein when a maximum straight line size of the device under test (DUT) is D and a wavelength of a radio signal used by the antenna under test is λ, the measurement antenna is disposed at a position having a distance R in an area of a radiative near field from the reference point as represented by the following equation.

$$0.62\sqrt{\frac{D^3}{\lambda}} < R < \frac{2D^2}{\lambda}.$$

12. The antenna apparatus according to claim 3,
wherein when a maximum straight line size of the device under test (DUT) is D and a wavelength of a radio signal used by the antenna under test is λ, the measurement antenna is disposed at a position having a distance R in an area of a radiative near field from the reference point as represented by the following equation.

$$0.62\sqrt{\frac{D^3}{\lambda}} < R < \frac{2D^2}{\lambda}.$$

13. The antenna apparatus according to claim 4,
wherein when a maximum straight line size of the device under test (DUT) is D and a wavelength of a radio signal used by the antenna under test is λ, the measurement antenna is disposed at a position having a distance R in an area of a radiative near field from the reference point as represented by the following equation.

$$0.62\sqrt{\frac{D^3}{\lambda}} < R < \frac{2D^2}{\lambda}.$$

14. The antenna apparatus according to claim 2,
wherein the scanning means includes
a turntable that is rotatable around an azimuth shaft,
a support member vertically installed on the turntable,
a device under test (DUT) placement unit that is disposed in parallel to the turntable with respect to the support member and is rotatable around a roll shaft, and
driving means that includes first rotation driving means which rotatably drives the azimuth shaft and second rotation driving means which rotatably drives the roll shaft.

15. The antenna apparatus according to claim 3,
wherein the scanning means includes
a turntable that is rotatable around an azimuth shaft,
a support member vertically installed on the turntable,
a device under test (DUT) placement unit that is disposed in parallel to the turntable with respect to the support member and is rotatable around a roll shaft, and
driving means that includes first rotation driving means which rotatably drives the azimuth shaft and second rotation driving means which rotatably drives the roll shaft.

16. The antenna apparatus according to claim 4,
wherein the scanning means includes
a turntable that is rotatable around an azimuth shaft,
a support member vertically installed on the turntable,
a device under test (DUT) placement unit that is disposed in parallel to the turntable with respect to the support member and is rotatable around a roll shaft, and driving means that includes first rotation driving means which rotatably drives the azimuth shaft and second rotation driving means which rotatably drives the roll shaft.

17. The antenna apparatus according to claim 5, wherein the scanning means includes
a turntable that is rotatable around an azimuth shaft,
a support member vertically installed on the turntable,
a device under test (DUT) placement unit that is disposed in parallel to the turntable with respect to the support member and is rotatable around a roll shaft, and
driving means that includes first rotation driving means which rotatably drives the azimuth shaft and second rotation driving means which rotatably drives the roll shaft.

18. The antenna apparatus according to claim 2, further comprising:
a reflector that is accommodated in the internal space, has a predetermined paraboloid of revolution, and reflects a radio signal transmitted or received by the antenna under test and the test antenna via the paraboloid of revolution.

19. The antenna apparatus according to claim 3, further comprising:
a reflector that is accommodated in the internal space, has a predetermined paraboloid of revolution, and reflects a radio signal transmitted or received by the antenna under test and the test antenna via the paraboloid of revolution.

20. A measurement method of performing measurement on a device under test (DUT) by using an antenna apparatus including
an anechoic box that includes an internal space not affected by a surrounding radio wave environment,
scanning means that executes total spherical scanning by setting a center of a spherical coordinate system as a reference point and rotatably driving a device under test (DUT) having an antenna under test around the reference point as a center to sequentially face all orientations set in advance in the spherical coordinate system, in the internal space,
a measurement antenna that receives a radio signal in a spurious frequency bandwidth radiated from the antenna under test transmitting and receiving radio signals in a specified frequency bandwidth during execution of the total spherical scanning, and
near field measurement processing means that performs a near field measurement process related to power of the radio signal in the spurious frequency bandwidth, based on a reception signal of the measurement antenna disposed at a distance within a near field measurement range from the reference point, the method comprising:
a placement step of placing the device under test (DUT) on a device under test (DUT) placement unit of the scanning means in the anechoic box;
a test signal output step of outputting a test signal to the device under test (DUT) via the test antenna by a simulation measurement apparatus;
a total spherical scanning step of executing the total spherical scanning on the device under test (DUT) placed on the device under test (DUT) placement unit by the scanning means;
a signal reception step of receiving a radio signal in the spurious frequency bandwidth output together with a signal under measurement from the device under test (DUT) to which the test signal is input, during execution of the total spherical scanning, by the measurement antenna; and
a near field measurement processing step of performing a near field measurement process related to power of the radio signal in the spurious frequency bandwidth, based on a reception signal of each of the measurement antennas in the signal reception step.

* * * * *